(12) United States Patent
van der Straten et al.

(10) Patent No.: US 12,457,907 B2
(45) Date of Patent: Oct. 28, 2025

(54) MAGNETORESISTIVE RANDOM-ACCESS MEMORY WITH TOP AND BOTTOM ELECTRODES DEPOSITED IN UNISON

(71) Applicant: International Business Machines Corporation, Armonk, NY (US)

(72) Inventors: Oscar van der Straten, Guilderland Center, NY (US); Koichi Motoyama, Clifton Park, NY (US); Chih-Chao Yang, Glenmont, NY (US)

(73) Assignee: International Business Machines Corporation, Armonk, NY (US)

( * ) Notice: Subject to any disclaimer, the term of this patent is extended or adjusted under 35 U.S.C. 154(b) by 571 days.

(21) Appl. No.: 17/931,689

(22) Filed: Sep. 13, 2022

(65) Prior Publication Data
US 2024/0090337 A1   Mar. 14, 2024

(51) Int. Cl.
*H10N 50/10*     (2023.01)
*H10B 61/00*    (2023.01)
*H10N 50/01*     (2023.01)
*H10N 50/80*     (2023.01)

(52) U.S. Cl.
CPC ............. *H10N 50/10* (2023.02); *H10B 61/00* (2023.02); *H10N 50/01* (2023.02); *H10N 50/80* (2023.02)

(58) Field of Classification Search
CPC ........ H10N 50/10; H10N 50/80; H10N 50/01; H10B 61/00
USPC ......................................................... 257/421
See application file for complete search history.

(56) References Cited

U.S. PATENT DOCUMENTS

| | | | |
|---|---|---|---|
| 9,502,640 B1 | 11/2016 | Annunziata | |
| 9,553,129 B2 | 1/2017 | Jiang | |
| 9,559,294 B2 | 1/2017 | Hsu | |
| 10,796,833 B2* | 10/2020 | Lanzillo | H10N 50/85 |
| 11,114,606 B2 | 9/2021 | Reznicek | |
| 12,250,827 B2* | 3/2025 | van der Straten | H10N 50/01 |
| 12,317,506 B2* | 5/2025 | Yeong | H10D 1/692 |
| 2009/0209050 A1 | 8/2009 | Wang | |
| 2011/0049655 A1 | 3/2011 | Assefa | |
| 2013/0075840 A1 | 3/2013 | Satoh | |
| 2016/0276580 A1 | 9/2016 | Tahmasebi | |
| 2020/0395535 A1* | 12/2020 | Liao | H01F 41/34 |
| 2021/0217811 A1* | 7/2021 | Min | H10N 50/80 |
| 2021/0249427 A1* | 8/2021 | Yeong | H10D 1/692 |
| 2021/0280776 A1* | 9/2021 | Frougier | H10N 50/80 |
| 2022/0209101 A1* | 6/2022 | Liou | H10N 50/01 |
| 2023/0039834 A1* | 2/2023 | Hashemi | H10N 50/01 |

(Continued)

*Primary Examiner* — Jami Valentine Miller
(74) *Attorney, Agent, or Firm* — Monchai Chuaychoo

(57) ABSTRACT

A method to form a semiconductor structure for a magnetoresistive random-access memory (MRAM) device where the material for the top electrode and the bottom electrode is deposited in a single process. The method includes conformally depositing an electrode material over a magnetic tunnel junction (MTJ) pillar, under the MTJ pillar, around a spacer encapsulating and extending above the MTJ pillar. The method includes recessing the electrode material to form a thinner portion of the electrode material over the MTJ pillar. The thinner portion of the electrode material forms a thinner portion of the electrode material over the MTJ pillar that is a top electrode. The portion of the electrode material under the MTJ pillar forms a bottom electrode that is thicker than the top electrode.

12 Claims, 22 Drawing Sheets

(56) References Cited

U.S. PATENT DOCUMENTS

| | | | |
|---|---|---|---|
| 2023/0044333 A1* | 2/2023 | van der Straten | H10N 50/10 |
| 2023/0061985 A1* | 3/2023 | Chuang | H10N 50/10 |
| 2023/0144157 A1* | 5/2023 | Motoyama | H10N 50/80 |
| | | | 257/421 |
| 2023/0371393 A1* | 11/2023 | Hsu | G11C 11/161 |
| 2024/0099148 A1* | 3/2024 | Chen | H10N 50/80 |

\* cited by examiner

TOP DOWN VIEW

MAGNETORESISTIVE RANDOM-ACCESS MEMORY WITH TOP AND BOTTOM ELECTRODES DEPOSITED IN UNISON

BACKGROUND OF THE INVENTION

The present invention relates generally to the field of semiconductor device manufacture and more particularly to the formation of magnetoresistive random-access memory (MRAM) device structures.

Increasing computing function requiring both more device circuits and faster processing speeds continues for computer systems and applications. In particular, the use of deep neural networks is becoming pervasive in many end-use computer applications. Deep neural networks are typically used in artificial intelligence (AI) applications. The training of deep neural networks puts significant demand on the memory system in computer systems executing AI with deep neural networks.

Magnetoresistive random-access memory (MRAM) is a type of non-volatile random-access memory that stores data in magnetic domains. Magnetoresistive Random Access Memory (MRAM), based on the integration of silicon-based complementary silicon-oxide semiconductor (CMOS) with magnetic tunnel junction (MTJ) technology, is a developing non-volatile memory technology using vertical structures or pillars containing the magnetic tunnel junctions. MRAM technology provides many advantages in terms of writing/read speed, power consumption, and lifetime over other commercialized memory types including SRAM, DRAM, Flash, etc. Conventional MRAM devices include a magnetic tunnel junction (MTJ) structure having magnetic layers separated by an intermediary non-magnetic tunnel barrier layer. Digital information can be stored in the memory element and can be represented by directions of magnetization vectors. In response to the current applied to the MTJ, the magnetic memory element exhibits different resistance values and allows an MRAM device to provide information stored in the magnetic memory element. Typically, MRAM devices may be fabricated with a field-effect transistor (FET) which can access the MRAM device.

SUMMARY

Embodiments of the present invention disclose a method of forming a semiconductor structure for a magnetoresistive random-access memory (MRAM) device where the material for the top electrode and the bottom electrode is deposited in a single process. The method includes conformally depositing an electrode material over a magnetic tunnel junction (MTJ) pillar, under the MTJ pillar, around a spacer encapsulating and extending above the MTJ pillar. The method includes recessing the electrode material to form a thinner portion of the electrode material over the MTJ pillar. The thinner portion of the electrode material forms the top electrode over the MTJ pillar. The portion of the electrode material under the MTJ pillar forms a bottom electrode that is thicker than the top electrode.

Embodiments of the present invention provide a semiconductor structure for a magnetoresistive random-access memory (MRAM) device with a metal nitride liner around at least the bottom surface and sidewalls of the bottom electrode, outside surfaces of the spacer encapsulating the MTJ pillar, and the bottom surface and sidewalls of the top electrode. A metal contact is on the top electrode. Embodiments of the present invention provide a semiconductor structure with a spacer encapsulating sidewalls of a magnetic tunnel junction (MTJ) pillar and the top electrode on the MTJ pillar. The spacer extends above the top surface of the top electrode and the top surface of the electrode material extending up from the bottom electrode. Embodiments of the present invention include a metal pad that is under the metal liner around the bottom surface of the bottom electrode and is in a semiconductor layer above one or more front end of line semiconductor devices. Embodiments of the present invention provide a thinner top electrode and a thicker bottom electrode that are composed of the same material that is deposited in one deposition.

BRIEF DESCRIPTION OF THE DRAWINGS

The above and other aspects, features, and advantages of various embodiments of the present invention will be more apparent from the following description taken in conjunction with the accompanying drawings.

DETAILED DESCRIPTION

Figure 1:
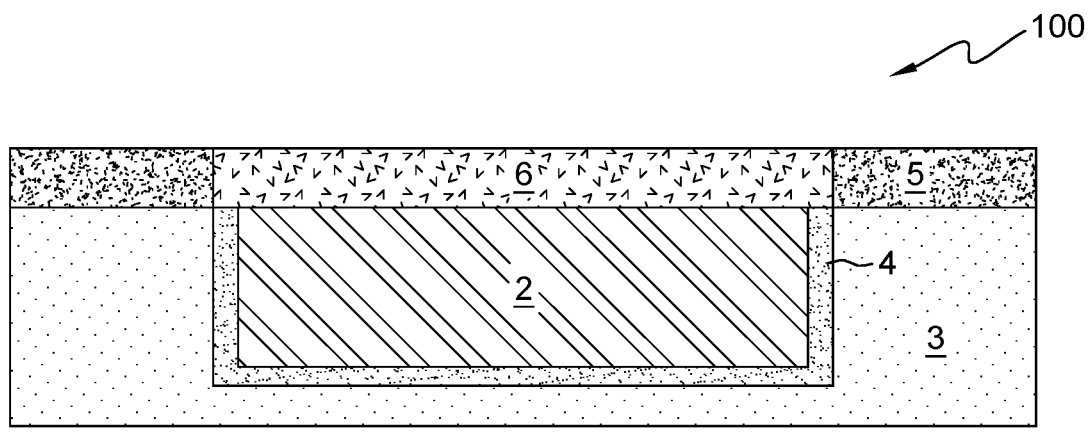
FIG. 1 depicts a cross-sectional view of a semiconductor structure after forming a metal cap on a metal contact in a dielectric cap layer in accordance with an embodiment of the present invention.

Embodiments of the present invention recognize that high-performance MRAM devices are based on perpendicular magnetic tunnel junctions (MTJs) with well-defined interfaces. For optimal MRAM device performance, interface control is essential in the MTJ. Embodiments of the present invention recognize that MTJ structures are typically pillars formed on a bottom electrode by the patterning and etching of many sequentially deposited layers of the magnetic and non-magnetic materials forming the MTJ stack. Typically, reactive ion etching (ME) and ion beam etching (IBE) processes are used to etch the MTJ stack to form an MTJ pillar. Embodiments of the present invention recognize that using ME and IBE on an MTJ stack on the bottom electrode causes re-sputtering of the metal layers in the bottom electrode directly under the MTJ stack. Embodiments of the present invention recognize that re-sputtering of the bottom metal electrode layer under the MTJ stack onto the sidewalls of the MTJ pillar creates shorts in the MTJ pillar and the resulting MRAM device. Embodiments of the present invention recognize that developing a method of forming MTJ pillars without re-sputtering of metal materials on the MTJ pillar would be desirable.

Additionally, embodiments of the present invention recognize that typically a polycrystalline material is deposited as a hardmask over the MTJ stack prior to etching. However, embodiments of the present invention recognize that the polycrystalline hardmask material has large grain boundaries and defects in the crystalline structure of the polycrystalline hardmask that can create uneven edges of the polycrystalline hardmask during etching of the MTJ stack. The uneven edges in the surface of the polycrystalline hardmask can be transferred or created in the top surface and sidewall of the MTJ pillar under the polycrystalline hardmask during the ME and/or IBE etching process. MTJ pillars with significant circular edge roughness negatively impact the electrical performance of the resulting MRAM devices. Embodiments of the present invention recognize that using a material for the hardmask over MTJ stack without grain boundaries or crystal defects would be desirable to reduce edge roughness and improve the resulting MRAM device performance.

Embodiments of the present invention provide a semiconductor structure for MRAM devices and a method for forming the semiconductor structure with MTJ pillars that are encapsulated and formed before depositing the electrode metal thereby eliminating re-sputtering of the electrode metal onto the MTJ pillar during the etching of an MTJ stack. The elimination of the presence of the electrode metal during MTJ stack etching processes to form the MTJ pillar prevents re-sputtering of the electrode metal on the MTJ pillars and reduces shorting of the tunnel barrier layer by the re-sputtered metal material on the MTJ pillar. Preventing re-sputtering of the bottom electrode metal improves MRAM device yields.

Embodiments of the present invention provide a semiconductor structure and a method of forming the semiconductor structure where the electrode metal for both the top and the bottom electrode is deposited in a single deposition process after forming the MTJ pillar for the MRAM device. The electrode metal is deposited over a metal nitride liner in the single conformal deposition process where the metal nitride liner and the electrode metal are deposited over, under, and around the MTJ pillar that is encapsulated by a dielectric material.

Additionally, embodiments of the present invention provide the semiconductor structure for MRAM devices and the method of forming the MRAM devices where the MTJ pillar is a pillar with a round or oval top surface that has smooth and even surfaces around the top surface of the MTJ pillar and around vertical sides or sidewall of the MTJ pillar. The smooth and even surfaces of the top edge of the circular or oval top surface of the MTJ pillar and vertical sides of the MTJ pillar are created by depositing a hardmask material without grain boundaries or without significant grain boundaries over the MTJ stack prior to etching the MTJ stack to form the MTJ pillar. An amorphous material without grain boundaries or a material with small, regular grain boundaries is used instead of the polycrystalline hardmask material of a conventional MRAM. The material without grain boundaries or with a small grain size is deposited and patterned over the MTJ stack instead of the conventional hardmask material. The amorphous material or a material with small grain boundaries that is deposited on the MTJ stack can be etched without causing circular edge roughness or uneven sides in the resulting MTJ pillars. The MTJ pillars forming using the amorphous dielectric material as a hardmask during etching are essentially free of rough edges and rough or uneven sidewalls and therefore, provide improved electrical perform electrical performance in the completed MRAM device than conventional MRAM devices.

Embodiments of the present invention provide a semiconductor structure for MRAM devices and the method of forming MRAM devices where both the top and the bottom electrode metal is deposited in a single process step. Embodiments of the present invention provide a semiconductor structure where the top electrode and the bottom electrode are composed of the same electrode material that is deposited in one deposition process. A single, conformal deposition of the electrode material forms both the top and the bottom electrodes of the MRAM device. Embodiments of the present invention provide a top electrode that is thinner than the bottom electrode.

Embodiments of the present invention provide a method of forming an embedded MRAM device structure by depositing a layer of a bottom dielectric material above a metal pad or contact in a dielectric cap material. The method includes depositing a stack of materials for a magnetic tunnel junction over the bottom dielectric material. The method includes depositing a layer of a top dielectric material over the stack of materials for the MTJ stack, where the dielectric material is an amorphous material or a material with small grain boundaries acting as a hardmask material over the MTJ stack. Small grain boundaries occur in materials with small grain sizes. With the dielectric material with small or minimal grain boundaries as the hardmask over the MTJ stack and using conventional MTJ pillar etching processes to etch the MTJ stack creates an MTJ pillar with smooth edges around the circular or oval outside edges of the MTJ pillar. Using the dielectric material with small to no grain boundaries as a hardmask over the MTJ stack prevents circular edge roughness in the MTJ pillar and improves the resulting electrical performance of the MRAM device.

After forming the MTJ pillar, the method includes forming a spacer around the MTJ pillar and depositing an interlayer dielectric (ILD) over the semiconductor structure. Two or more via holes can be patterned and etched in the ILD adjacent to the MTJ pillar. The method includes removing the bottom dielectric and then, the top dielectric material over the MTJ pillar. The method includes conformally depositing an electrode material over, under, and around the encapsulated MTJ pillar and removing the excess electrode material. The method includes recessing the electrode material over the MTJ pillar and forming a contact to the electrode material over the MTJ pillar where the electrode material over the MTJ pillar forms the top electrode and the electrode material under the MTJ pillar contacting the metal pad is the bottom electrode of the MRAM device.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Some of the process steps, depicted, can be combined as an integrated process step. In addition, descriptions of well-known functions and constructions may be omitted for clarity and conciseness.

The terms and words used in the following description and claims are not limited to the bibliographical meanings but are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context dictates otherwise. Thus, for example, reference to "a component surface" includes reference to one or more of such surfaces unless the context dictates otherwise.

For purposes of the description hereinafter, terms such as "upper", "lower", "right", "left", "vertical", "horizontal", "top", "bottom", and derivatives thereof shall relate to the disclosed structures and methods, as oriented in the drawing figures. Terms such as "above", "overlying", "atop", "on top", "positioned on" or "positioned atop" mean that a first element, such as a first structure, is present on a second element, such as a second structure, wherein intervening elements, such as an interface structure may be present between the first element and the second element. The term "direct contact" or "contact" means that a first element, such as a first structure, and a second element, such as a second structure, are connected without any intermediary conducting, insulating or semiconductor layers at the interface of the two elements.

In the interest of not obscuring the presentation of embodiments of the present invention, in the following detailed description, some processing steps or operations that are known in the art may have been combined for presentation and for illustration purposes and in some instances may have not been described in detail. In other instances, some processing steps or operations that are known in the art may not be described at all. It should be understood that the following description is rather focused on the distinctive features or elements of various embodiments of the present invention.

Detailed embodiments of the claimed structures and methods are disclosed herein. The method steps described below do not form a complete process flow for manufacturing integrated circuits on semiconductor chips. The present embodiments can be practiced in conjunction with the integrated circuit fabrication techniques for semiconductor chips and devices currently used in the art, and only so much of the commonly practiced process steps are included as are necessary for an understanding of the described embodiments. The figures represent cross-section portions of a semiconductor chip or a substrate, such as a semiconductor wafer during fabrication, and are not drawn to scale, but instead are drawn to illustrate the features of the described embodiments. Specific structural and functional details disclosed herein are not to be interpreted as limiting, but merely as a representative basis for teaching one skilled in the art to variously employ the methods and structures of the present disclosure. In the description, details of well-known features and techniques may be omitted to avoid unnecessarily obscuring the presented embodiments.

Deposition processes for the metal materials and sacrificial material include, e.g., chemical vapor deposition (CVD), physical vapor deposition (PVD), atomic layer deposition (ALD), or gas cluster ion beam (GCIB) deposition. CVD is a deposition process in which a deposited species is formed as a result of a chemical reaction between gaseous reactants at greater than room temperature (e.g., from about 25 C to about 900 C.). The solid product of the reaction is deposited on the surface on which a film, coating, or layer of the solid product is to be formed. Variations of CVD processes include, but are not limited to, atmospheric pressure CVD (APCVD), low-pressure CVD (LPCVD), plasma enhanced CVD (PECVD), and metal-organic CVD (MOCVD), and combinations thereof may also be employed. In alternative embodiments that use PVD, a sputtering apparatus may include direct-current diode systems, radio frequency sputtering, magnetron sputtering, or ionized metal plasma sputtering. In alternative embodiments that use ALD, chemical precursors react with the surface of a material one at a time to deposit a thin film on the surface. In alternative embodiments that use gas cluster ion beams (GCIB) deposition, the high-pressure gas is allowed to expand in a vacuum, subsequently condensing into clusters. The clusters can be ionized and directed onto a surface, providing a highly anisotropic deposition.

Selectively etching as used herein includes but is not limited to patterning using one of lithography, photolithography, an extreme ultraviolet (EUV) lithography process, or any other known semiconductor patterning process followed by one or more etching processes. Various materials are referred to herein as being removed or "etched" whereas etching generally refers to one or more processes implementing the removal of one or more materials while leaving other protected areas of the materials that are masked during the lithography processes unaffected. Some examples of etching processes include but are not limited to the following processes, such as a dry etching process using a reactive ion etch (ME) or ion beam etch (IBE), a wet chemical etch process, or a combination of these etching processes. A dry etch may be performed using a plasma. Ion milling, sputter etching, or reactive ion etching (ME) bombards the wafer with energetic ions of noble gases that approach the wafer approximately from one direction, and therefore, these processes are an anisotropic or a directional etching process.

As known by one skilled in the art, damascene processes for forming circuit lines and/or contacts typical include various steps of patterning of via holes and trenches in a dielectric material, such as an interlayer dielectric and filling the via holes and trenches with a layer of metal and planarizing the metal using a chemical mechanical (CMP) process to remove overburden or excess metal.

References in the specification to "one embodiment", "other embodiment", "another embodiment", "an embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to affect such feature, structure, or characteristic in connection with other embodiments whether or not explicitly described.

Reference will now be made in detail to the embodiments of the present invention, examples of which are illustrated in the accompanying drawings, wherein like reference numerals refer to like elements throughout.

FIG. 1 depicts a cross-sectional view of semiconductor structure 100 after forming metal cap 6 on metal pad 2 with liner 4 in interlayer dielectric (ILD) 3 in accordance with an embodiment of the present invention. As depicted, FIG. 1 includes metal pad 2, liner 4, metal cap 6, dielectric cap 5, and ILD 3 where metal pad 2 may be a contact, a pad, or a portion of a wire or line in a middle of the line (MOL) or back end of the line (BEOL) semiconductor layer. In various embodiments, one or more front end of the line (FEOL) semiconductor devices resides below metal pad 2. In one embodiment, metal pad 2 is a contact in or to a FEOL semiconductor device. Metal pad 2 may be composed of any known metal contact or wiring material for semiconductor devices, such as MRAMs. For example, metal pad 2 may be composed of any known metal materials, such as, but not limited to, tungsten (W), copper (Cu), platinum (Pt), cobalt (Co), or ruthenium (Ru) used in semiconductor chips.

Liner 4 can be composed of a metal nitride material, a pure metal material, or a combination of layers of one or more of these materials. For example, liner 4 may be composed of but not limited to one or more of metal materials, such as tantalum (Ta), titanium (Ti), W, Co, or Ru, or metal nitride materials, such as tungsten-nitrogen alloys (e.g., WN), hafnium-nitride alloys (e.g., HfN), titanium-nitrogen alloys, tantalum-nitrogen alloys (e.g., TaN), titanium-aluminum-nitrogen alloys, or tantalum-aluminum-nitrogen alloys.

In various embodiments, liner 4 under and around metal pad 2 may be titanium (Ti) or titanium nitride (TiN) when metal pad 2 is composed of tungsten (W). In other examples, liner 4 may be tantalum (Ta) or tantalum nitride (TaN) when metal pad 2 is composed of copper (Cu). Metal pad 2 and liner 4 are not limited to these materials.

In various embodiments, metal cap 6 resides over metal pad 2 and may be composed of but not limited to TiN or WN. Dielectric cap 5 may be any material used as a dielectric cap material in MRAM devices, such as but not limited to silicon nitride (SiN).

Figure 2:
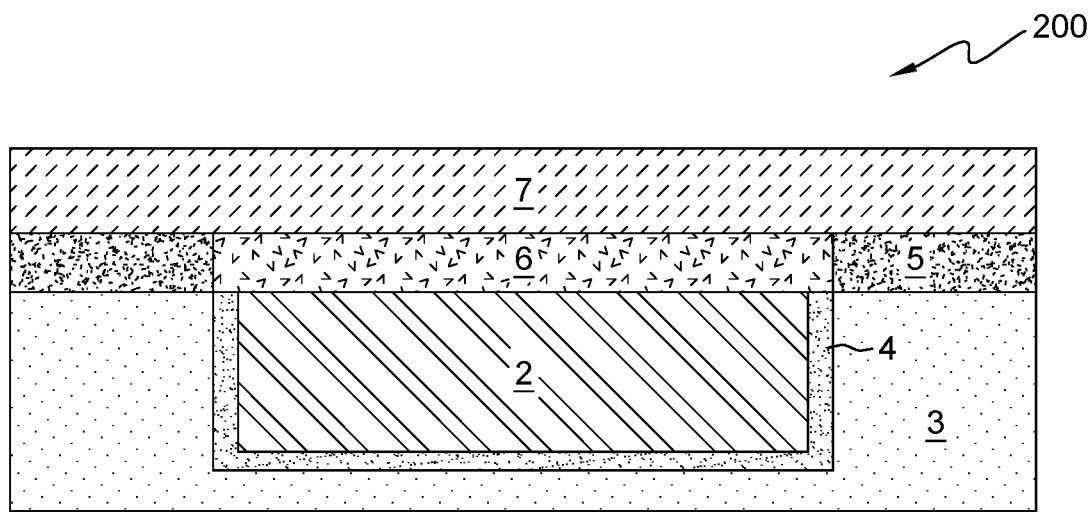
FIG. 2 depicts a cross-sectional view of the semiconductor structure after depositing a bottom dielectric layer over the metal cap and the dielectric cap layer in accordance with an embodiment of the present invention.

FIG. 2 depicts a cross-sectional view of semiconductor structure 200 after depositing bottom dielectric 7 over the metal cap 6 and dielectric cap 5 in accordance with an embodiment of the present invention. As depicted, FIG. 2 includes the elements of FIG. 1 and bottom dielectric 7. In various embodiments, bottom dielectric 7 is composed of silicon dioxide ($SiO_2$) or SiON. In some cases, bottom dielectric 7 may be composed of another dielectric material used in semiconductor device formation. Bottom dielectric 7 may be deposited by PVD, ALD, CVD, or PECVD. The thickness of bottom dielectric 7 is suitable for a thickness of a bottom electrode for an MRAM device. For example, the thickness of bottom dielectric 7 may range from 2 nm to 50 nm but is not limited to this range.

Figure 3:
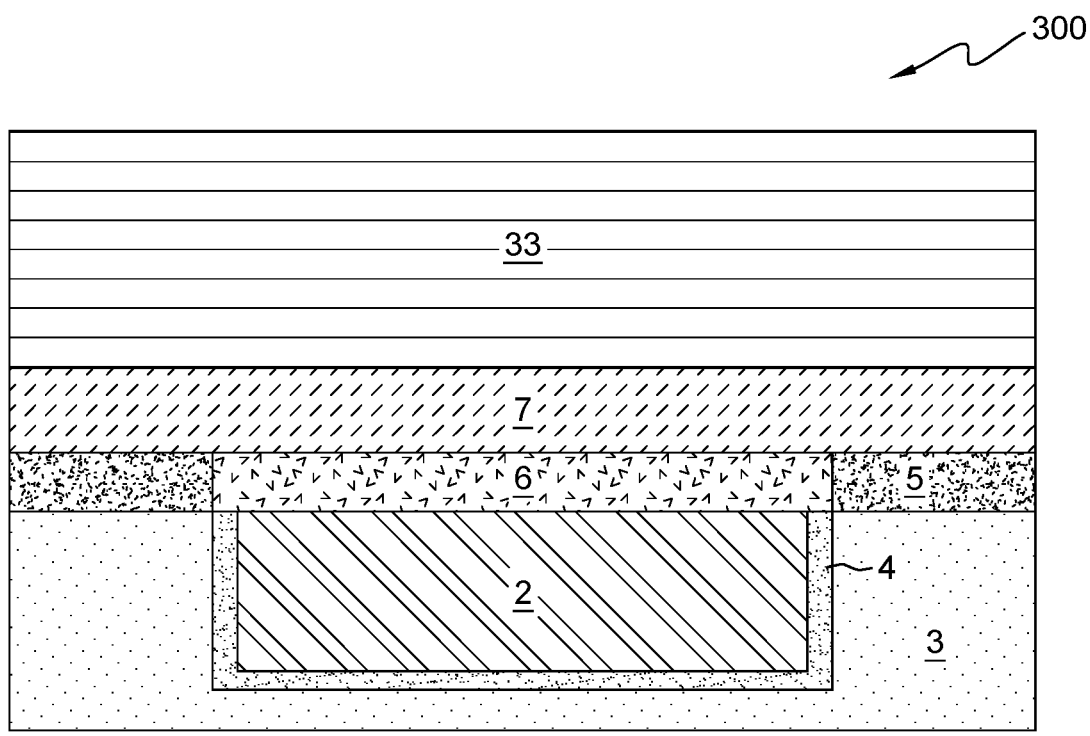
FIG. 3 depicts a cross-sectional view of the semiconductor structure after forming a stack of material layers for a magnetic tunnel junction in accordance with an embodiment of the present invention.

FIG. 3 depicts a cross-sectional view of semiconductor structure 300 after forming MTJ stack 33 in accordance with an embodiment of the present invention. As depicted, FIG. 3 includes the elements of FIG. 2 with MTJ stack 33. In FIG. 3, MTJ stack 33 is over top dielectric 7.

As known to one skilled in the art, MTJ stack 33 can include one or more layers of a cobalt-based synthetic anti-ferromagnet (SAF), a cobalt-iron-boron (CoFeB) based reference layer, a magnesium oxide (MgO) based tunnel layer, CoFeB based free layer, and cap layers containing Ta or ruthenium (Ru) but are not limited to these MTJ stack materials. Typically, an MTJ stack of materials is composed of many very thin layers of various magnetic and non-magnetic layers deposited using one or more known deposition processes (e.g., ALD, PVD, etc.) in a sequential manner to form MTJ stack 33.

Figure 4:
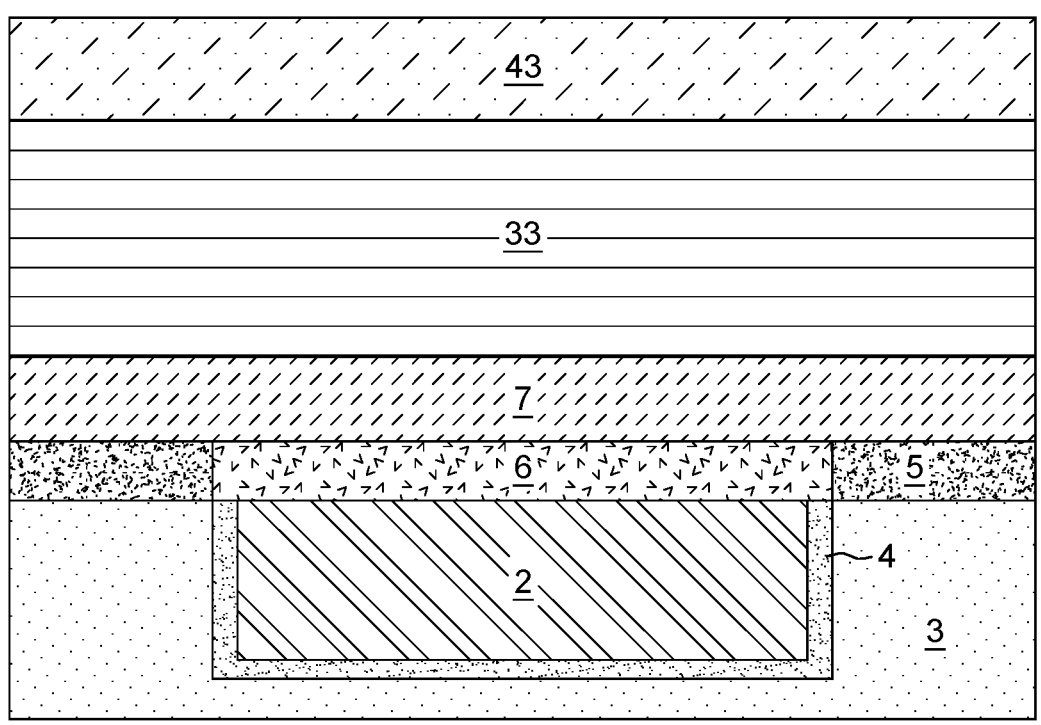
FIG. 4 depicts a cross-sectional view of the semiconductor structure after depositing a top dielectric layer over the stack of material layers for the magnetic tunnel junction (MTJ) in accordance with an embodiment of the present invention.

FIG. 4 depicts a cross-sectional view of semiconductor structure 400 after depositing top dielectric 43 over MTJ stack 33 in accordance with an embodiment of the present invention. As depicted, FIG. 4 includes the elements of FIG. 3 and top dielectric 43. Top dielectric 43 may be composed of an amorphous dielectric material or a dielectric material without significant or without substantial grain boundaries. Using a material without grain boundaries or with minimal grain boundaries prevents circular edge roughness in the MRAM pillar during later etching processes to form the MRAM pillar. For example, small grain boundaries may refer to small grain sizes which can be grains with dimensions less than 1 nm, although materials with grain sizes larger than 1 nm and smaller than 1 nm may be used for top dielectric 43 to reduce or prevent edge roughness during MRAM stack etching in later processes to form the MRAM pillar.

In various embodiments, top dielectric 43 is deposited directly on the top surface of MTJ stack 33 by one of PVD, ALD, CVD, or PECVD but is not limited to these processes. As previously discussed, using a dielectric material without pronounced grain boundaries or without grain boundaries (e.g., an amorphous material) over MTJ stack 33 instead of the typical polycrystalline hardmask material used in conventional MRAM formation processes prevents circular edge roughness when etching MTJ stack 33 to form the MRAM pillar as depicted later in FIG. 5. For example, top dielectric 43 may be composed of a metal oxide, such as $Al_2O_3$, $ZrO_2$, $HfO_2$, but top dielectric 43 is not limited to these materials and may be any suitable material with minimal to no grain boundaries or a small grain size. Metal oxides such as $Al_2O_3$, $ZrO_2$, and $HfO_2$ are examples of amorphous materials without grain boundaries.

Figure 5:
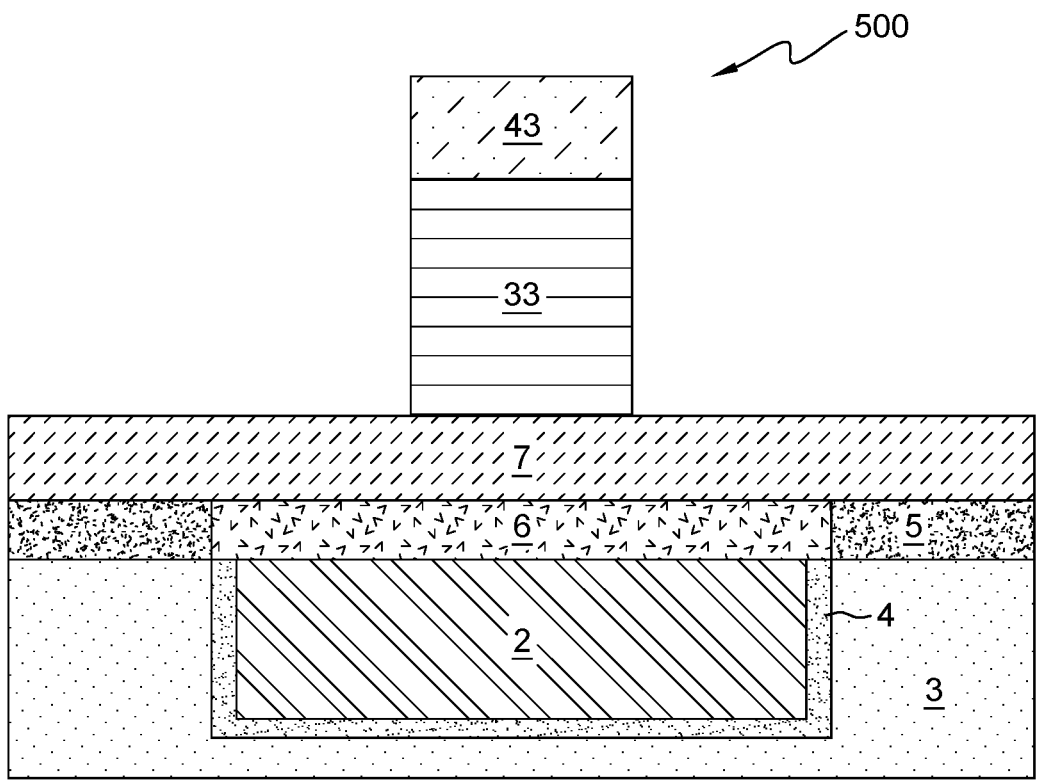
FIG. 5 depicts a cross-sectional view of the semiconductor structure after patterning and etching portions of the stack of material layers to form a MTJ pillar in accordance with an embodiment of the present invention.

FIG. 5 depicts a cross-sectional view of semiconductor structure 500 after patterning and etching portions of MTJ stack 33 and top dielectric 43 to form an MTJ pillar in accordance with an embodiment of the present invention. As depicted, FIG. 5 includes the elements of FIG. 4 without some portions of MTJ stack 33 and without some portions of top dielectric 43. As discussed in detail above, top dielectric 43 is one of an amorphous material or a material with small grain boundaries and/or a small grain size.

The top surface and sidewall of MTJ pillar 33 after directionally etching with an amorphous material over MTJ pillar 33 creates outer top surface edges and sidewalls of MTJ pillar 33 that are smoother (i.e., with little to no top edge or sidewall roughness) than conventionally formed MTJ pillars. Using known processes, top dielectric 43 can be patterned using lithography and portions of MTJ stack 33 and top dielectric removed using various known etching processes. For example, a reactive ion etch (RIE), an ion beam etch (IBE), or a combination of these processes can be used to remove exposed portions of top dielectric 43 and MTJ stack 33. For the purposes of the present invention, after directionally etching, the remaining portion of MTJ stack 33, will be called MTJ pillar 33 hereinafter.

As a result of patterning and etching top dielectric 43 above the MTJ material stack when top dielectric 43 has minimal or no grain boundaries, the resulting MTJ pillar 33, will have the edges of the top surface of MTJ pillar 33 with little roughness or will have a low circular edge roughness. Similarly, the vertical sidewalls of MTJ pillar 33 are smooth and even and have little surface roughness caused during the directional etching of the stack of MTJ material. After the etching process, the outer edges of top dielectric 43 and circular top surface and edges of the top surface of MTJ pillar 33 are smooth and even. The sidewall of MTJ pillar 33 like the top surface of top dielectric 43 and the top surface of MTJ pillar 33 are essentially without rough or uneven surfaces (i.e., the sidewall of MTJ pillar 33 is smooth and even). As previously discussed, in conventional MRAM devices using a polycrystalline hardmask with large grain boundaries on the MTJ pillar results in the top edge and vertical sides of the MTJ pillar that are rough and uneven. The vertical sides of MTJ pillar 33 with top dielectric 43 over MTJ pillar 33, after directionally etching MTJ pillar 33 using top dielectric 43, are smooth and provide improved electrical performance of MTJ pillar 33. As depicted, MTJ pillar 33 resides on a portion of bottom dielectric 7. In various embodiments, MTJ pillar 33 is a column with a round or oval shape but is not limited to these shapes.

Additionally, as previously discussed, when etching semiconductor structure 400 to form semiconductor structure 500, there are no exposed metal materials such as am electrode material under MTJ pillar 33 that can cause MTJ tunnel barrier layer shorts by re-sputtering of the metal or electrode material (i.e., MTJ stack 33 in FIG. 4 resides directly on bottom dielectric 7). After etching the stack of materials to form MTJ pillar 33 using bottom dielectric 7 under the stack of materials provides a sidewall of MTJ pillar 33 that is clean and without or free of re-sputtered electrode metal since the bottom electrode metal is not present in semiconductor structure 500.

Figure 6:
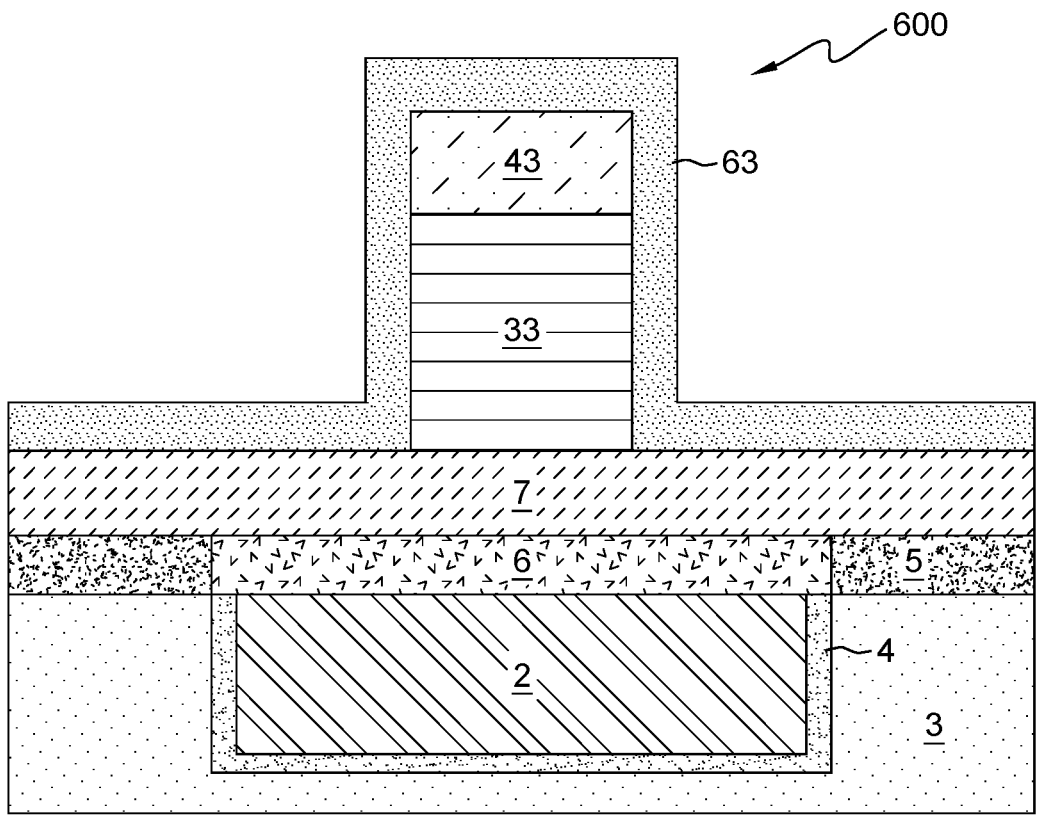
FIG. 6 depicts a cross-sectional view of the semiconductor structure after depositing a dielectric encapsulation layer in accordance with an embodiment of the present invention.

FIG. 6 depicts a cross-sectional view of semiconductor structure 700 after depositing dielectric encapsulation 63 in accordance with an embodiment of the present invention. As depicted, FIG. 6 includes the elements of FIG. 5 and dielectric encapsulation 63. A layer of dielectric encapsulation 63 is deposited over semiconductor structure 700.

Dielectric encapsulation 63 can be deposited by known deposition processes, such as ALD, PVD, or CVD, for example. Dielectric encapsulation 63 can be composed of SiN, another suitable nitride, an oxide, or other suitable dielectric material used in spacers for MRAM pillars or other semiconductor devices. The thickness of the layer of conformally deposited dielectric encapsulant 63 typically can be in the range of 2 to 50 nm but is not limited to this range and varies according to MTJ pillar 33 size. Dielectric encapsulant 63 covers exposed surfaces of top dielectric 43 on MTJ pillar 33, the sidewall of MTJ pillar 33, and the exposed top surface of top dielectric 7. In various embodiments, dielectric encapsulant 63 is a spacer around MTJ pillar 33.

Figure 7:
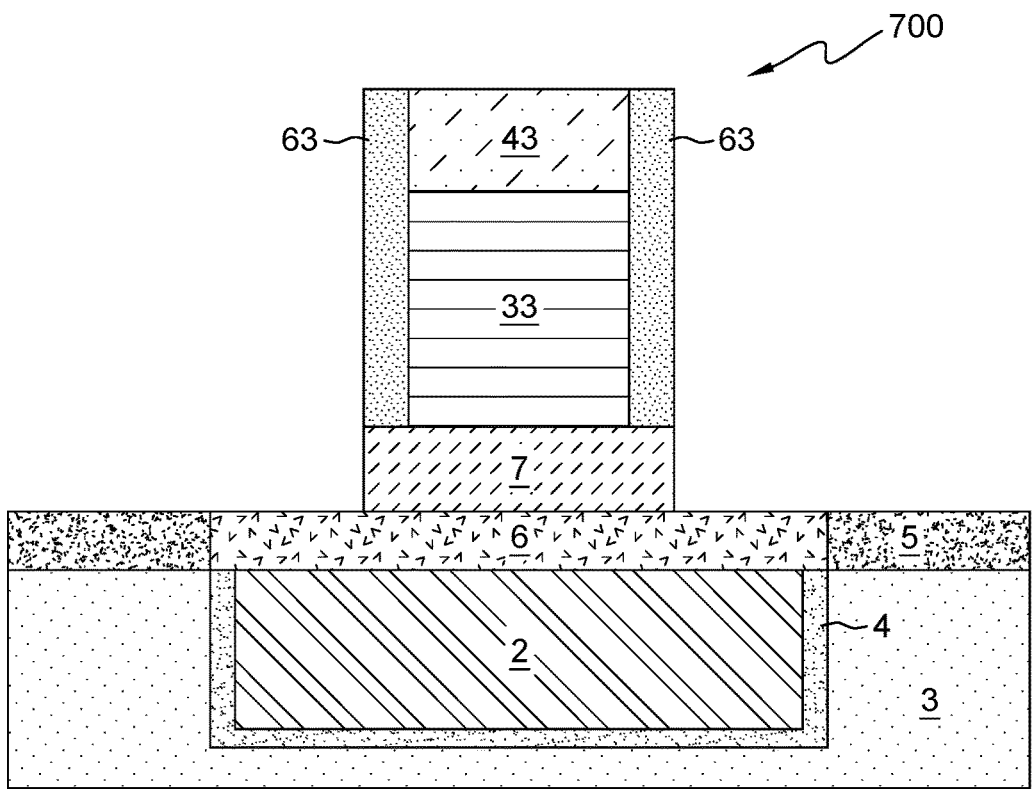
FIG. 7 depicts a cross-sectional view of the semiconductor structure after performing an etch process to remove horizontal portions of the dielectric encapsulation layer and the bottom dielectric layer in accordance with an embodiment of the present invention.

FIG. 7 depicts a cross-sectional view of the semiconductor structure after performing etching processes to remove the exposed horizontal portions of dielectric encapsulation 63 and bottom dielectric layer 7 in accordance with an embodiment of the present invention. As depicted, FIG. 7 includes the elements of FIG. 6 without the horizontal portions of dielectric encapsulant 63 and bottom dielectric 7. One or more anisotropic etching processes, such as ME, which may be selective to the exposed horizontal portions of bottom dielectric 7 and dielectric encapsulant 63.

In various embodiments, after using anisotropic etching process(es) that remove horizontal portions of bottom dielectric 7 and dielectric encapsulant 63, a vertical portion of dielectric encapsulant 63 remains around MTJ pillar 33 (e.g., encapsulates or forms a spacer around MTJ pillar 33) and top dielectric 43 above MTJ pillar 33. A wet or a dry etching process such as an ME may be used to remove the horizontal portions of dielectric encapsulant 63 and bottom dielectric 7 in a single step. After the etching process, a portion of bottom dielectric 7 remains under MTJ pillar 33.

In some embodiments, a two-step etching process is used to sequentially remove dielectric encapsulant 63 and then remove bottom dielectric 7. For example, using known spacer etching processes, a first etching process (e.g., a selective ME or another similar process) removes the horizontal portions of dielectric encapsulant 63 and leaves the vertical portions of dielectric encapsulant 63. A second etching process follows the first etch of dielectric encapsulant 63 to remove horizontal portions of bottom dielectric 7. The first and the second etching processes can be one or more of a dry etching process or a wet etching process to remove dielectric encapsulant 63 and then, bottom dielectric 7.

Figure 8:
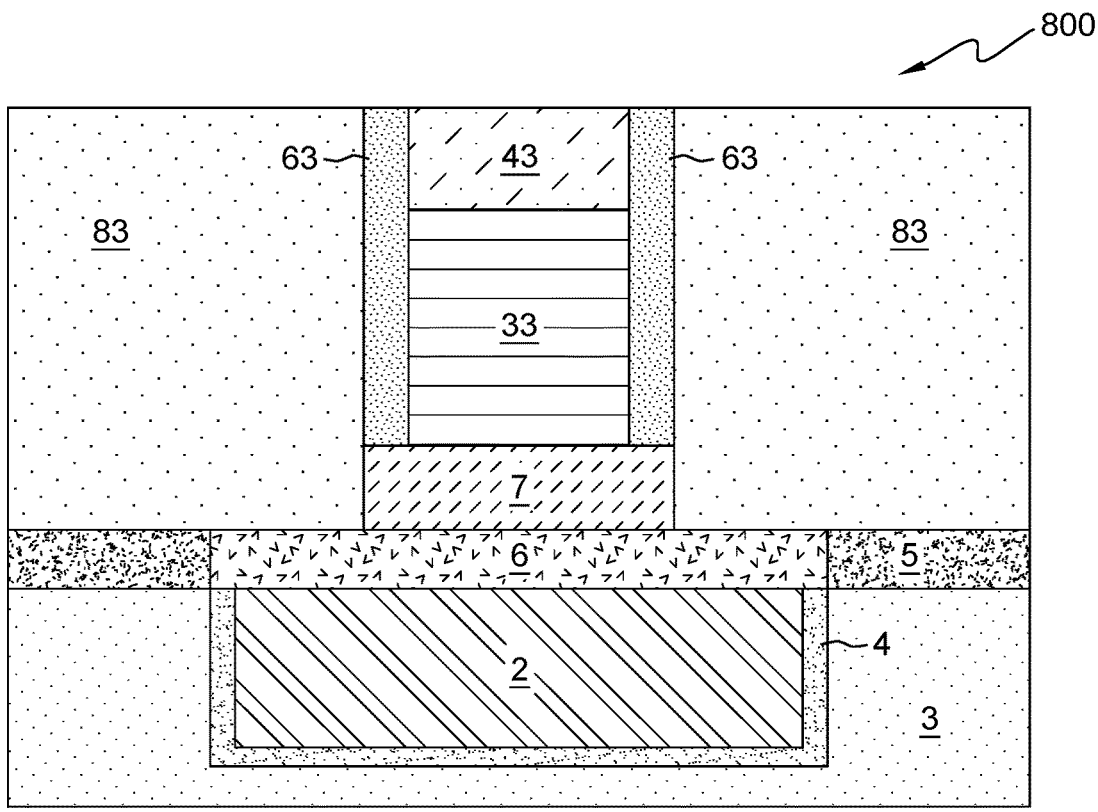
FIG. 8 depicts a cross-sectional view of the semiconductor structure after depositing an interlayer dielectric (ILD) around the exposed portions of the metal cap and dielectric cap layer in accordance with an embodiment.

FIG. 8 depicts a cross-sectional view of semiconductor structure 800 after depositing interlayer dielectric (ILD) 83 in accordance with an embodiment of the present invention. As depicted, FIG. 8 depicts ILD 83 deposited around dielectric encapsulant 63 and bottom dielectric 7 and on exposed portions of metal cap 6 and dielectric cap 5 layer using known ILD deposition processes (e.g., PVD, CVD, etc.). ILD 83 can be composed of any known dielectric material (e.g., $SiO_2$, etc.) used as an interlayer dielectric in semiconductor device formation processes. A CMP may planarize the top surface of semiconductor structure 800 and expose a portion of top dielectric 43 after ILD deposition.

Figure 9A:
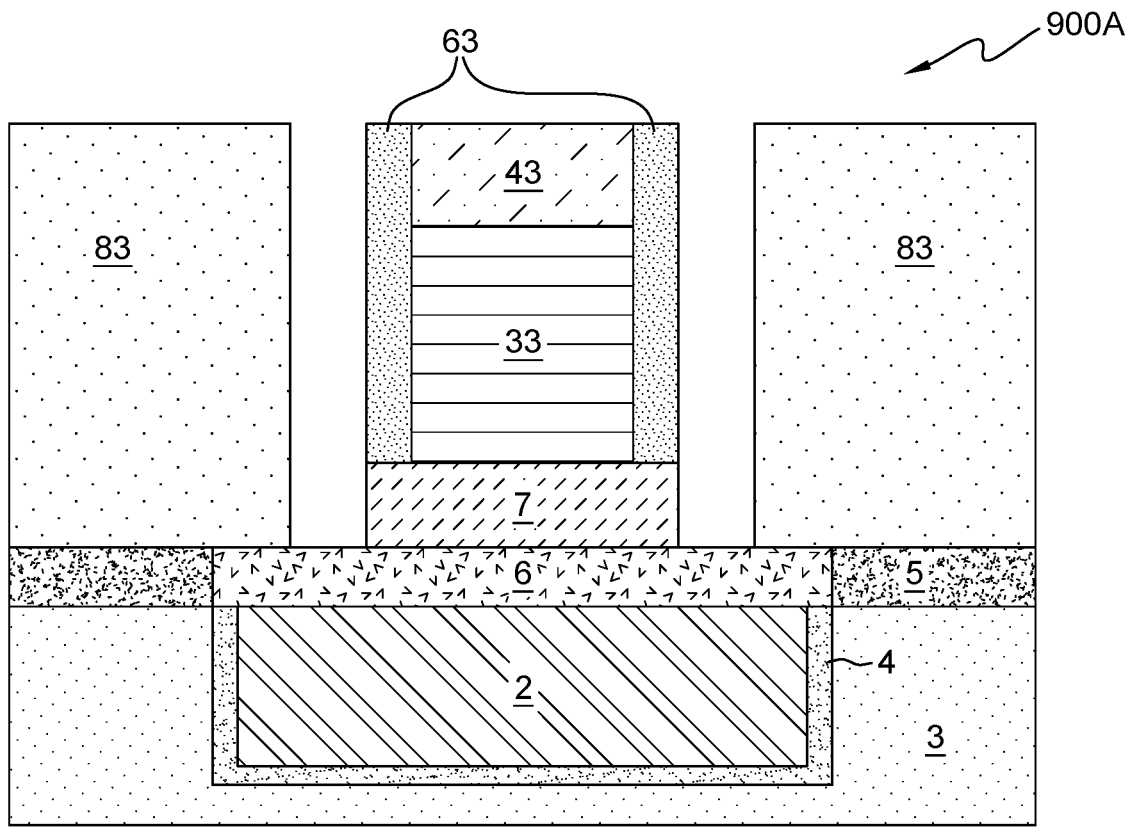
FIG. 9A depicts a cross-sectional view of the semiconductor structure after removing portions of the ILD adjacent to the remaining portion of the dielectric encapsulation layer and the bottom dielectric layer in accordance with an embodiment of the present invention.

FIG. 9A depicts a cross-sectional view of semiconductor structure 900A after removing portions of ILD 83 adjacent to the remaining portion of dielectric encapsulant 63 and the remaining portion of bottom dielectric 7 under dielectric encapsulant 63 in accordance with an embodiment of the present invention. As depicted, FIG. 9A includes the elements of FIG. 8 without portions of ILD 83 directly adjacent to dielectric encapsulant 63 and above portions of metal cap 6. Using known patterning and etching processes (e.g., a dry or wet etching process) for via hole formation in a dielectric material, two or more via holes may be created adjacent to dielectric encapsulant 63 that is over MTJ pillar 33 and over portions of metal cap 6. The via holes each expose a portion of the sidewall of bottom dielectric 7.

In FIG. 9A, two via holes extending from the top surface of ILD 83 to the top surface of metal cap 6 can be patterned and etched (e.g., using RIE or a wet etching process). In some embodiments, more than two via holes are etched. The diameter of the via holes may be greater than 10 nm but may be larger or smaller in some examples. The via holes extend through ILD 83 to metal cap 6.

Figure 9B:
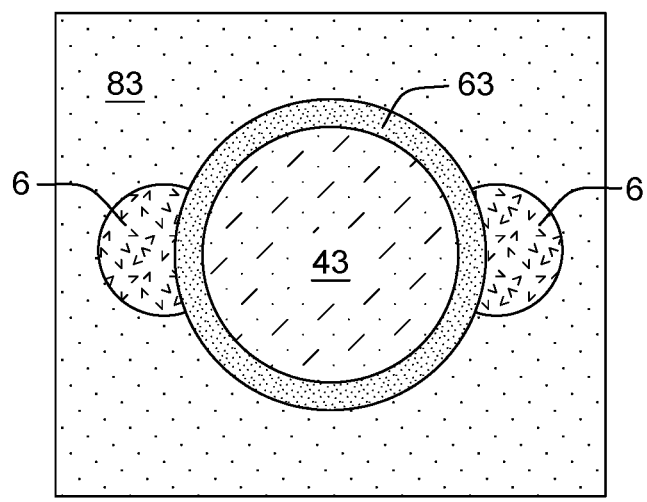
FIG. 9B illustrates a top view of the semiconductor structure of FIG. 9A in accordance with an embodiment of the present invention.

FIG. 9B illustrates a top view 900B of semiconductor structure 900A depicted in FIG. 9A in accordance with an embodiment of the present invention. As depicted, FIG. 900B includes a top surface of ILD 83, dielectric encapsulant 63, top dielectric 43, and exposed portions of metal cap 6 after etching two vias adjacent to dielectric encapsulant 63.

The two via holes extending down to metal cap 6 are depicted as round but may be oval or any other shape as defined by the patterning and etching of the via holes. As previously discussed, dielectric encapsulant 63 surrounds top dielectric 43 and MTJ pillar 33 (not depicted in FIG. 9B). In other examples, the number of via holes, the size, and shape of the via holes may be different and the size and shape of top dielectric 43 and MTJ pillar 33 (not depicted in FIG. 9B) may be different than the circle as depicted in FIG. 9B (e.g., the surface of top dielectric 43 may be an oval, a rectangle, etc.). As depicted in FIG. 9B, the via holes exposing the two portions of the top surface of metal cap 6 are adjacent to dielectric encapsulant 63 and each via hole directly contacts or exposes a portion of bottom dielectric 7. While FIG. 9B depicts two vias on opposing or opposite sides of dielectric encapsulant 63, in other examples, any number of via holes exposing one or more portions of metal cap 6 and exposing one or more portions of bottom dielectric 7 under dielectric encapsulant 63 can be formed in any location around dielectric encapsulant 63.

Figure 10:
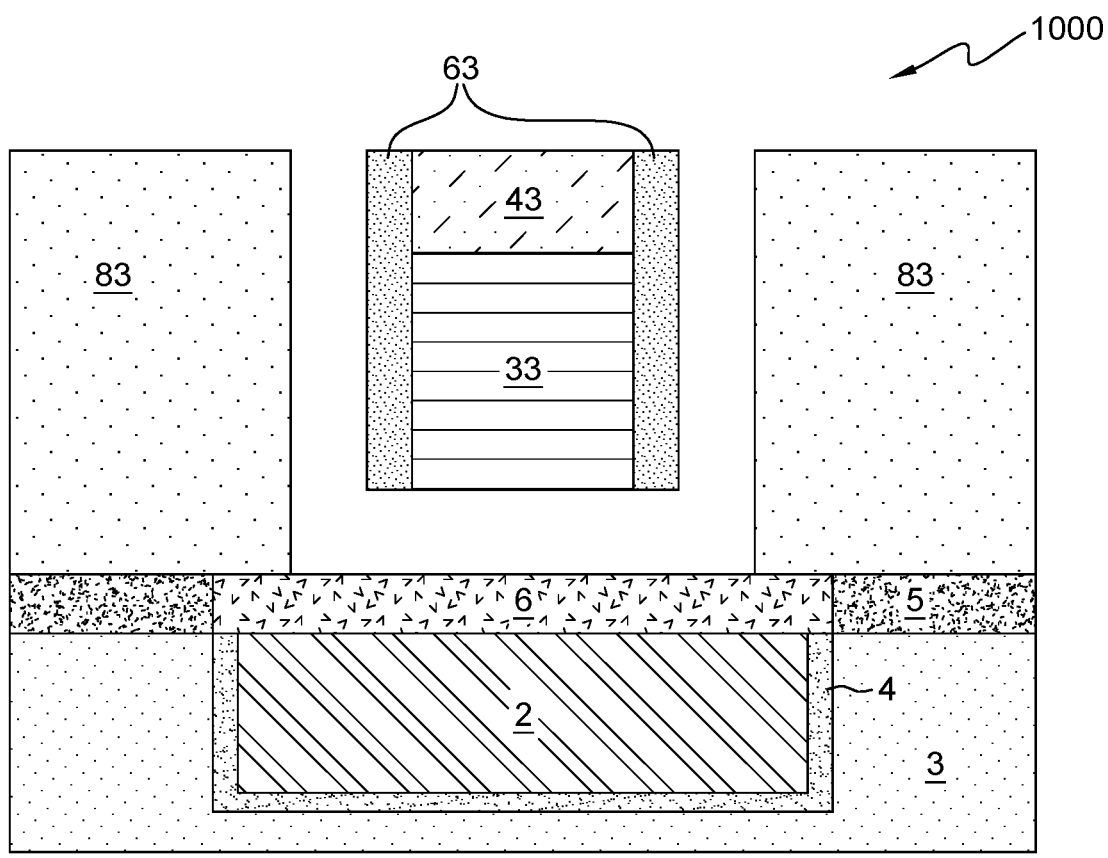
FIG. 10 depicts a cross-sectional view of the semiconductor structure after removing the portion of the bottom dielectric layer under the MTJ pillar in accordance with an embodiment of the present invention.

FIG. 10 depicts a cross-sectional view of semiconductor structure 1000 after removing the remaining portion of bottom dielectric 7 under MTJ pillar 33 in accordance with an embodiment of the present invention. As depicted, FIG. 10 includes ILD 3, metal pad 2, liner 4, metal cap 6, dielectric cap 5, MTJ pillar 33, dielectric encapsulation 63, top dielectric 43 over MTJ pillar 33, and ILD 83. For example, using a wet etching process (e.g., for lateral dielectric etching), bottom dielectric 7 is removed under MTJ pillar 33. After the dielectric etching process, the bottom surface of MTJ pillar 33, the bottom surface of dielectric encapsulant 63, and the top surface of metal cap 6 are exposed.

Figure 11:
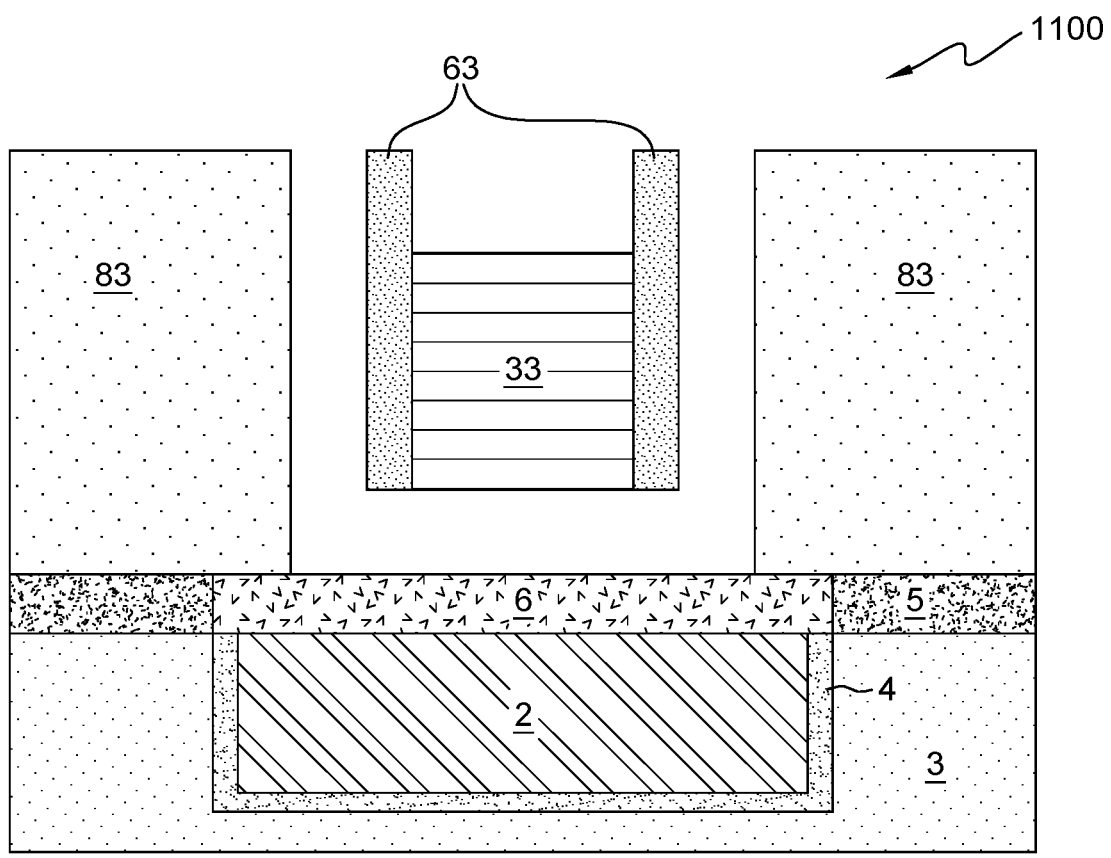
FIG. 11 depicts a cross-sectional view of the semiconductor structure after removing the top dielectric layer over the MTJ pillar in accordance with an embodiment of the present invention.

FIG. 11 depicts a cross-sectional view of semiconductor structure 1100 after removing the top dielectric 43 over MTJ pillar 33 in accordance with an embodiment of the present invention. As depicted, FIG. 11 includes the elements of FIG. 10 without top dielectric 43. Using one or more known wet or dry dielectric etching processes, top dielectric 43 is removed exposing the top surface of MTJ pillar 33.

Figure 12:
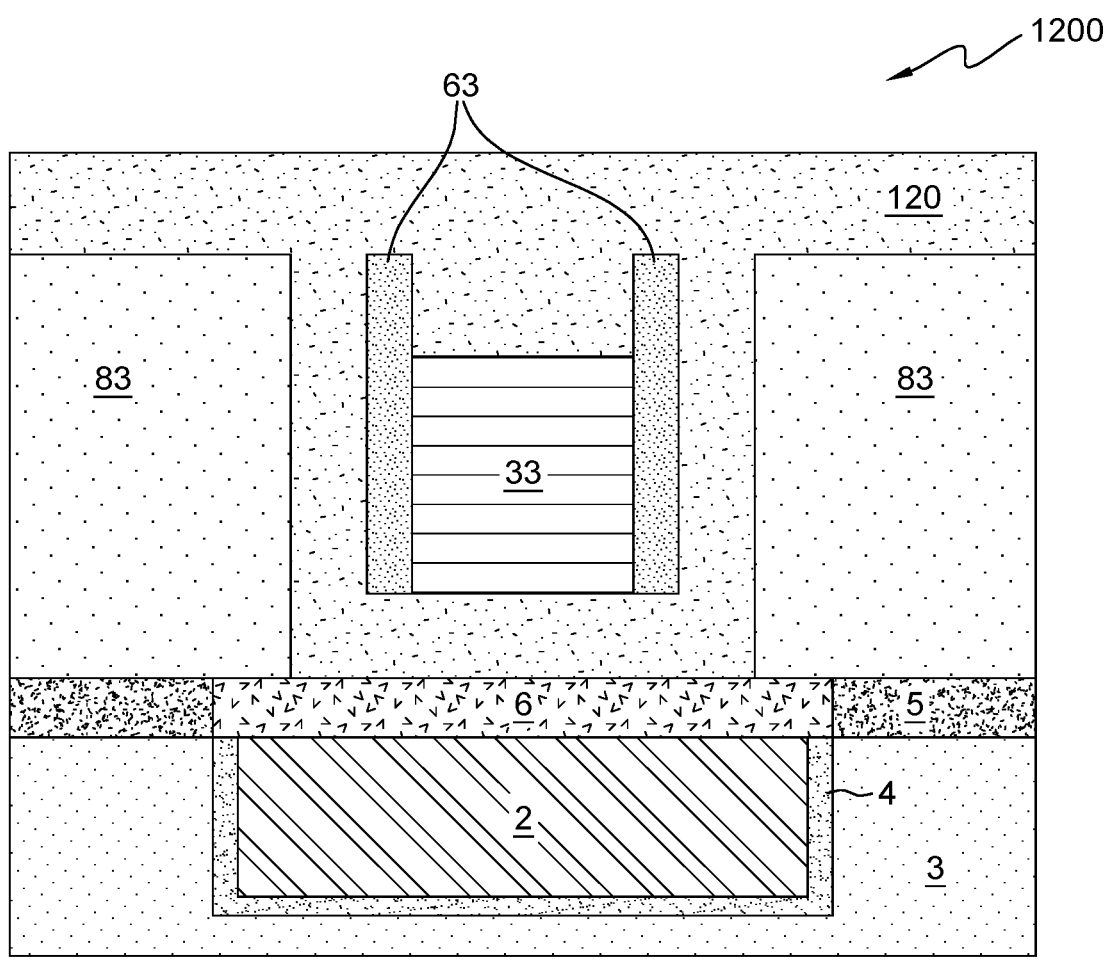
FIG. 12 depicts a top view of the semiconductor structure after conformally depositing an electrode metal in accordance with an embodiment of the present invention.

FIG. 12 depicts a top view of semiconductor structure 1200 after conformally depositing electrode material 120 in accordance with an embodiment of the present invention. As depicted, FIG. 12 includes the elements of FIG. 11 and electrode material 120. Using a conformal deposition process, such as but not limited to ALD or CVD, a layer of conductive material 12 for electrodes is deposited directly over and around the exposed portions of ILD 83, metal cap 6, dielectric encapsulant 63, MTJ pillar 33, and under MTJ pillar 33. For example, an electrode material or an electrode metal, such as but not limited to Ru, Pt, W, TaN, TiN, or a combination of these materials can be conformally deposited directly under, over, and around MTJ pillar 33 and dielectric encapsulant 63.

As depicted in FIG. 12, electrode material 120 fills the gap between metal cap 6 and under the bottom surface of MTJ pillar 33, covers the top surface of MTJ pillar 33 and ILD 83, and fills the gap or via holes formed between the vertical sides of ILD 83 and dielectric encapsulant 63. As depicted in FIG. 9B, two via holes are formed on opposite sides of dielectric encapsulant 63. As depicted in FIG. 12, electrode material 120 is conformally deposited on MTJ pillar 33, in the two via holes adjacent to dielectric encapsulant 63, and in the area under MTJ pillar 33. As previously discussed, more than two via holes adjacent to dielectric encapsulant 63 may be filled with electrode material 120 in other examples.

Electrode material 120 deposited in unison over and under MTJ pillar 33 will form the top electrode and the bottom electrode in the MRAM device. After the completion of additional process steps as depicted later in FIGS. 13-17, electrode material 120, deposited in this single conformal deposition process, will form both the top and bottom electrode for the MRAM device depicted later in FIG. 17. In various embodiments, a single deposition process of electrode material 120 provides the same electrode material, deposited in one deposition process, for both a top and a bottom electrode depicted later in FIG. 17.

As depicted in FIG. 12, the single electrode material deposition process is performed in embodiments of the present invention where electrode material 120 is deposited after forming MTJ pillar 33 rather than depositing the bottom electrode material before forming MTJ pillar 33 as typically occurs in forming conventionally MRAM devices. As previously discussed, depositing electrode material 120 after directionally etching MTJ stack 33 to form MTJ pillar 33 prevents re-sputtering of the electrode material on the sidewall of MTJ pillar 33 (i.e., improves device yields). Depositing electrode material 120 after forming dielectric encapsulation 63 around MTJ pillar 33 further prevents shorting and improves MRAM device yields.

Figure 13:
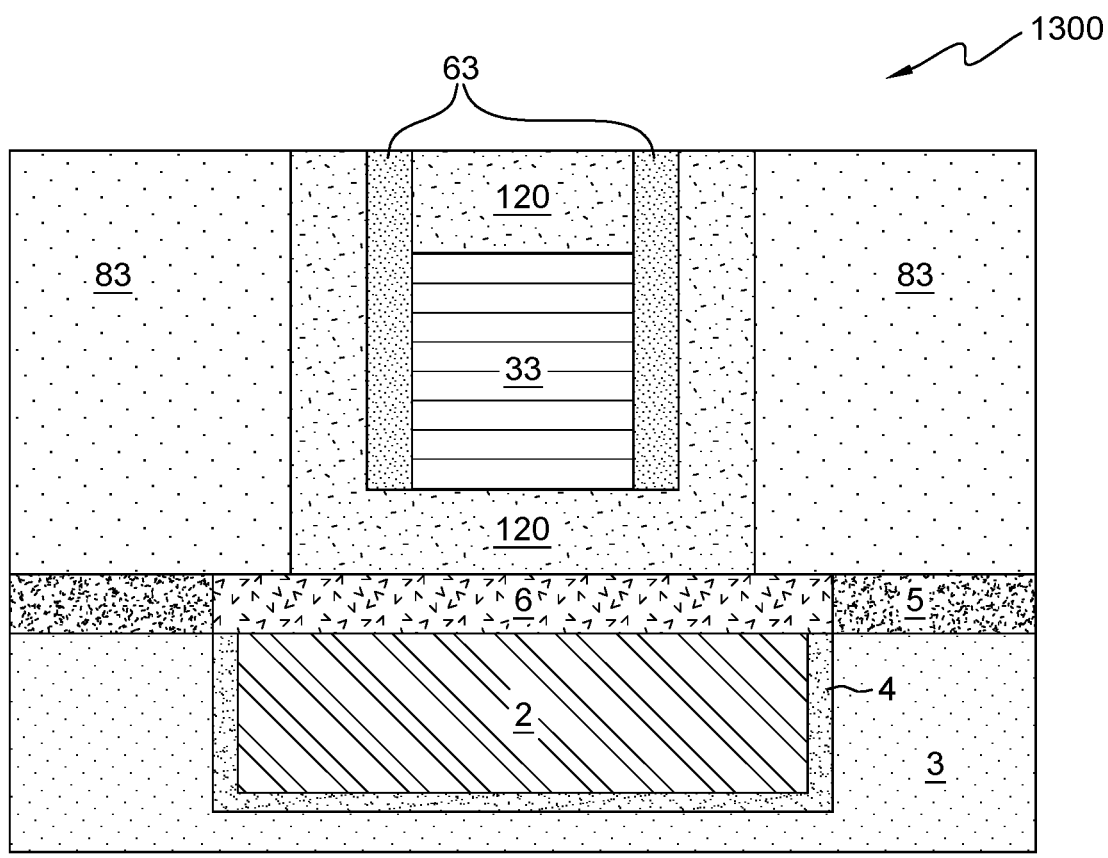
FIG. 13 depicts a cross-sectional view of the semiconductor structure after removing the excess electrode metal in accordance with an embodiment of the present invention.

FIG. 13 depicts a cross-sectional view of semiconductor structure 1300 after removing the excess electrode material 120 in accordance with an embodiment of the present invention. As depicted, FIG. 13 includes the elements of FIG. 12 without electrode material 120 over ILD 83. A CMP can remove excess electrode material 120 over ILD 83. After the CMP, a top surface of electrode material 120 over MTJ pillar 33 is exposed.

Figure 14:
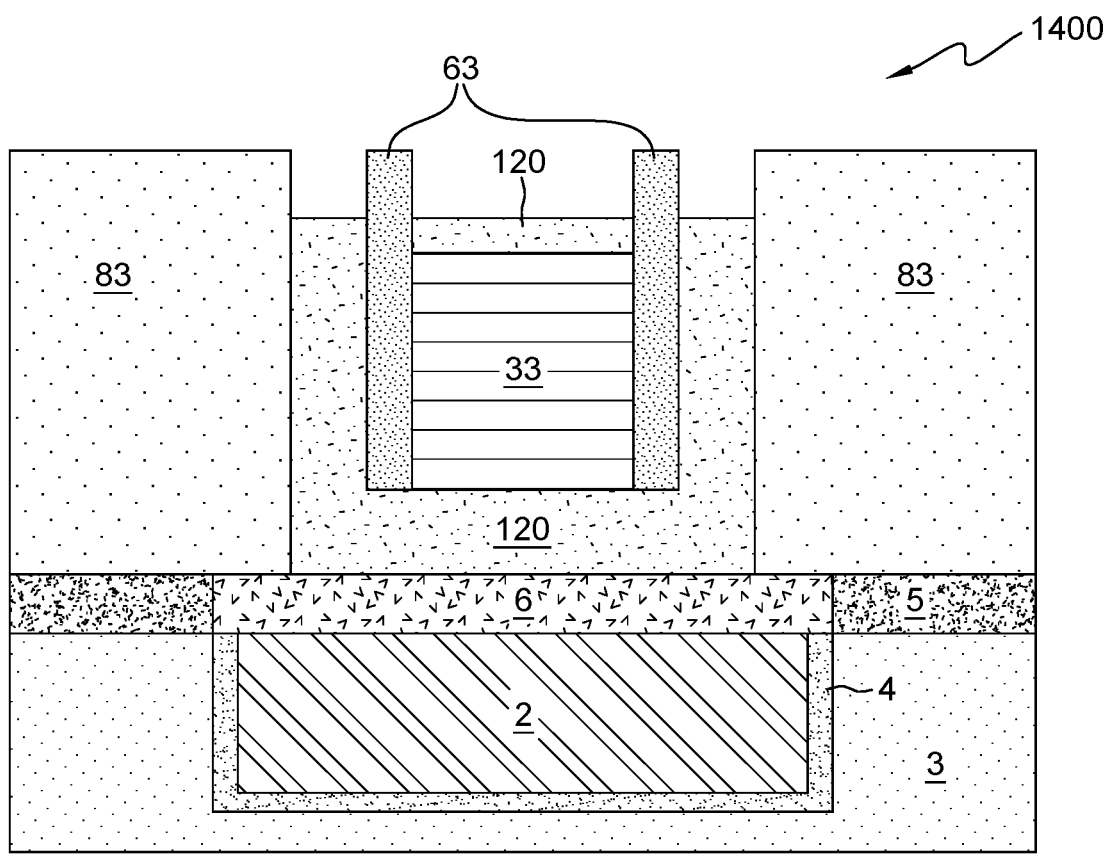
FIG. 14 depicts a cross-sectional view of the semiconductor structure after recessing the electrode metal over the MTJ pillar in accordance with another embodiment of the present invention.

FIG. 14 depicts a cross-sectional view of semiconductor structure 1400 after recessing electrode material 120 in accordance with another embodiment of the present invention. As depicted, FIG. 14 includes the elements of FIG. 13 with a top portion of electrode material 120 removed. After recessing electrode material 120 over MTJ pillar 33 and on dielectric encapsulation 63 adjacent to MTJ pillar 33, the remaining portion of electrode material 120 over MTJ pillar 33 becomes the top electrode for MTJ pillar 33. As depicted, electrode material 120 over MTJ pillar 33 is electrically isolated from electrode material 120 above metal cap 6 and under MTJ pillar 33 by the remaining vertical portion of dielectric encapsulant 63. In other words, the remaining dielectric encapsulant 63 separates and electrically isolates electrode material 120 over MTJ pillar 33 from electrode material 120 under MTJ pillar 33 that will form the bottom electrode of the MRAM device and the vertical extension of electrode material 120 around dielectric encapsulant 63 extending upward from the bottom electrode.

Using one of a wet etching process or a dry etching process (e.g., an RIE selective to electrode material 120), the top surface of electrode material 120 can be removed. After the etching process, the top surface of electrode material 120 is below the top surface of ILD 83 and the remaining portion of dielectric encapsulant 63. The thickness of the remaining portion of electrode material 120 over MTJ pillar 33 can typically be in the range of 2 to 40 nm but is not limited to this range of thicknesses. As depicted in FIG. 12, electrode material 120 remains along the vertical sides of ILD 83 and under MTJ pillar 33 with dielectric encapsulant 63. The remaining portion of electrode material 120 over MTJ pillar 33 is thinner than the portion of electrode material 120 under MTJ pillar 33.

Figure 15:
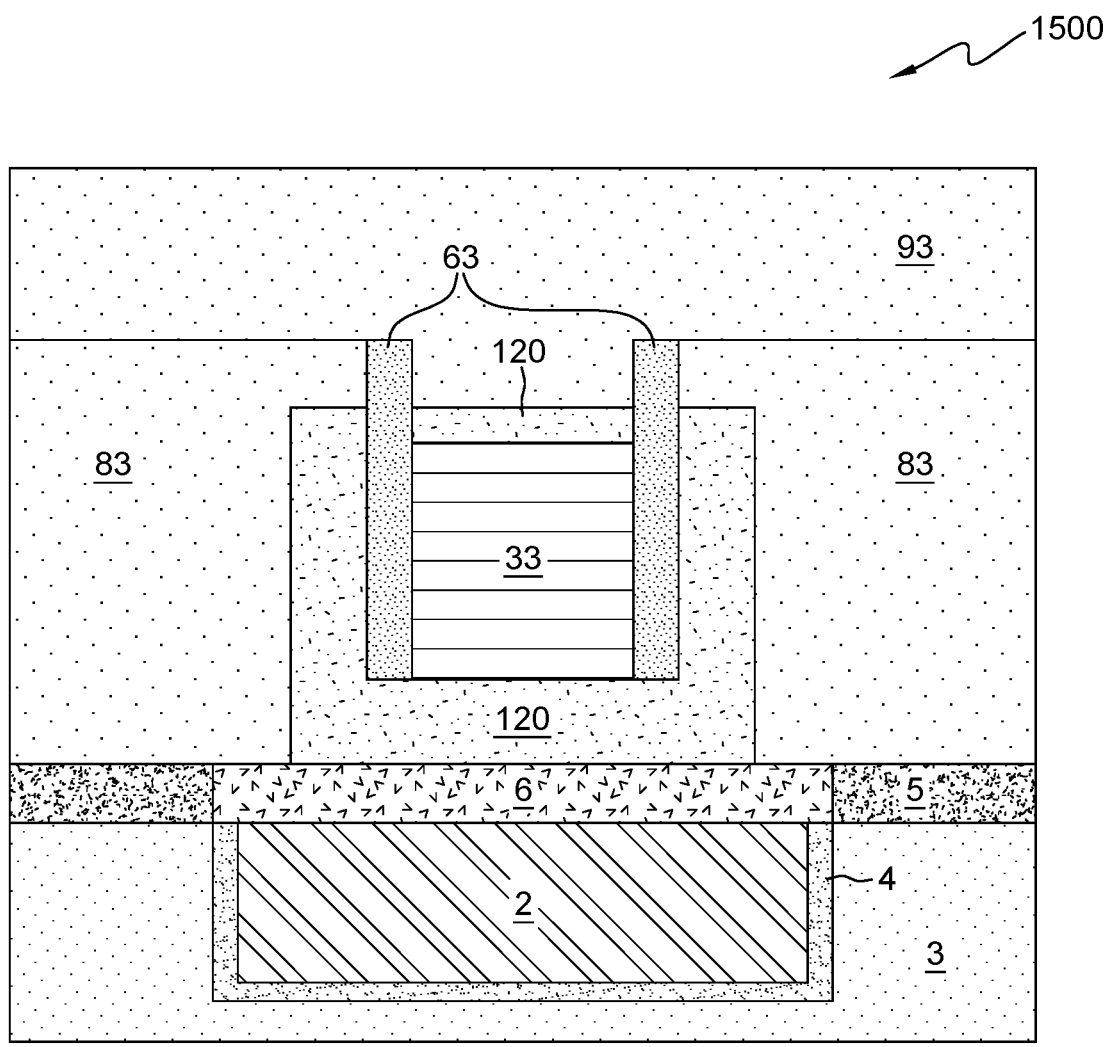
FIG. 15 depicts a cross-sectional view of the semiconductor structure after depositing another layer of ILD in accordance with an embodiment of the present invention.

FIG. 15 depicts a cross-sectional view of semiconductor structure 1500 after depositing another layer of ILD in accordance with an embodiment of the present invention. As depicted, FIG. 15 includes the elements of FIG. 14 and ILD 93. In various embodiments, ILD 93 is the same dielectric material as ILD 83. In some embodiments, ILD 93 is a different ILD material than ILD 83. ILD 93 extends over the top surface of dielectric encapsulant 63 as depicted in FIG. 15.

Figure 16:
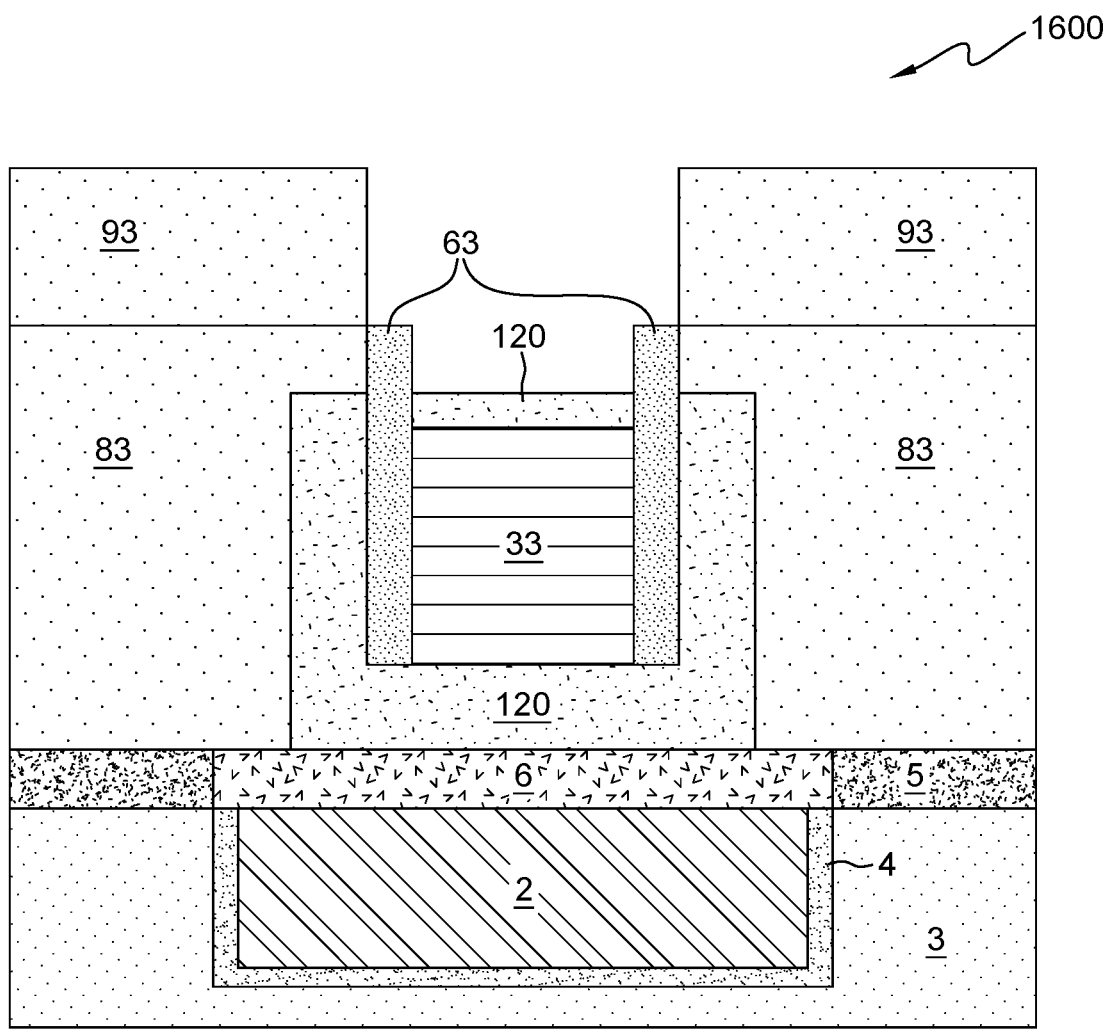
FIG. 16 depicts a cross-sectional view of the semiconductor structure after etching a contact via hole in accordance with an embodiment of the present invention.

FIG. 16 depicts a cross-sectional view of semiconductor structure 1600 after etching a contact via hole in accordance with an embodiment of the present invention. As depicted, FIG. 16 includes metal pad 2, ILD 3, liner 4, metal cap 6, dielectric cap 5, electrode material 120, ILD 83, ILD 93, MTJ pillar 33, and dielectric encapsulant 63. Using known contact via hole patterning and etching processes, a contact via hole in ILD 93 is formed over dielectric encapsulant 63 and the remaining portion of electrode material 120 over MTJ pillar 33. As previously depicted in FIG. 9B, dielectric encapsulant 63 forms a circle or a ring around MTJ pillar 33. The contact via hole is formed inside and over dielectric encapsulant 63 and above electrode material 120. The contact via hole is over a thin circular portion of electrode material 120 over MTJ pillar 33 that forms the top electrode and above the top surface of dielectric encapsulant 63.

Figure 17:
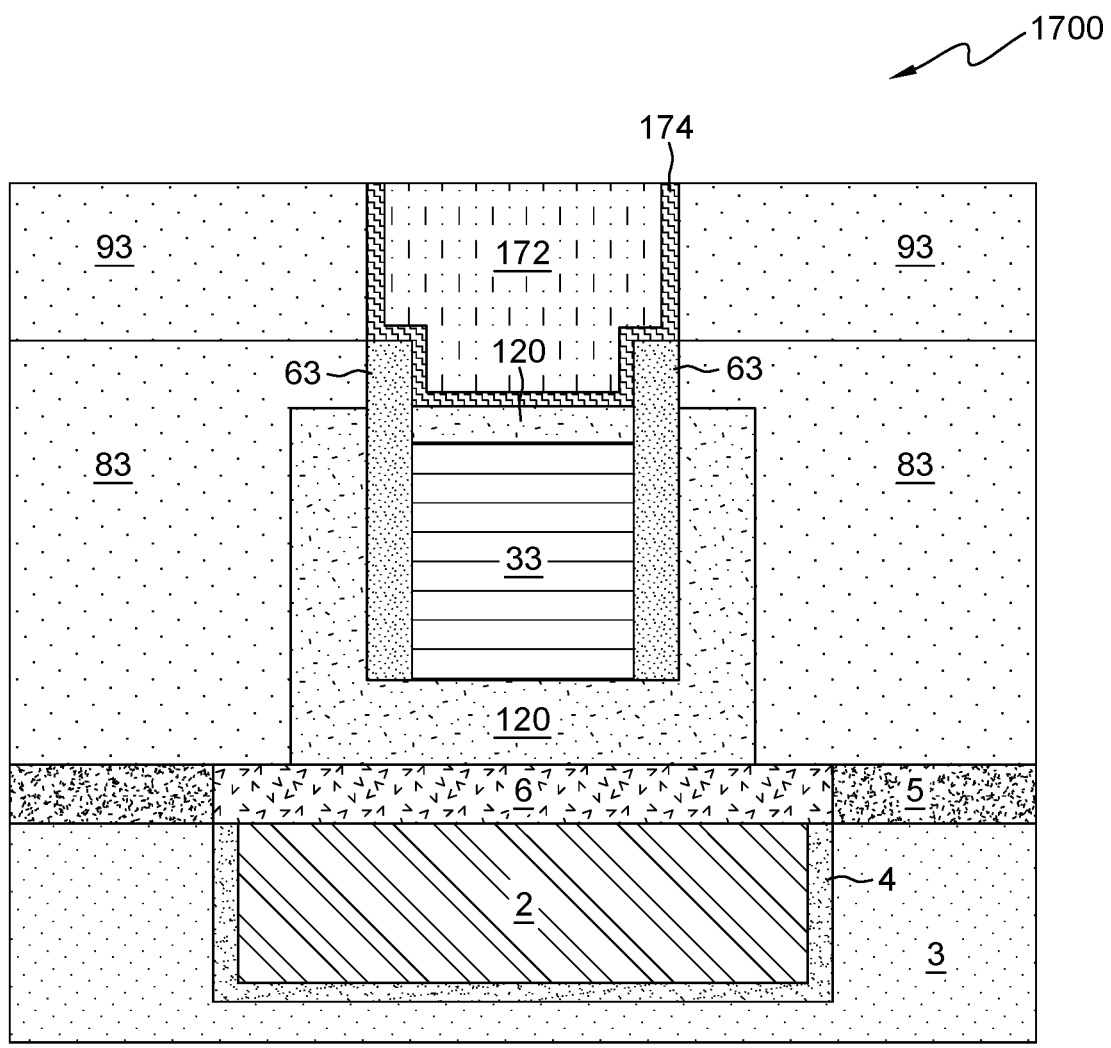
FIG. 17 depicts a cross-sectional view of the semiconductor structure after forming a contact in accordance with an embodiment of the present invention.

FIG. 17 depicts a cross-sectional view of semiconductor structure 1700 after forming contact 172 with contact liner 174 in accordance with an embodiment of the present invention. As depicted, FIG. 17 includes the elements of FIG. 16 with contact 172 and contact liner 174. Using known BEOL or MOL contact formation processes, contact liner 174 is deposited over semiconductor structure 1600. For example, contact liner 174 can be composed of any of the materials used for liner 4 and may be deposited by known liner deposition methods (e.g., ALD, PECVD, etc.).

After depositing contact liner 174, a layer of contact material is deposited over contact liner 174 for contact 172. The contact material can be any of the materials used for metal pad 2 but is not limited to these materials. For example, when contact liner 174 is composed of Ti or TiN, then, typically contact 172 could be composed of tungsten (W). Similarly, when contact liner 174 is composed of Ta or TaN, then, contact 172 could be composed of Cu. After depositing the material for contact 172 and contact liner 174, a CMP removes excess contact and contact liner material over ILD 93.

After the CMP and the completion of contact 172 with contact liner 174, contact liner 174 under contact 172 resides electrode material 120 over MTJ pillar 33. The remaining recessed portion of electrode material 120 over MTJ pillar 33 and under a portion of contact liner 174 forms the top electrode of the MRAM device. As depicted in FIG. 17, the portion of electrode material 120 under MTJ pillar 33 and above metal cap 6 s the bottom electrode of the MRAM device. The MRAM device includes MTJ pillar 33 with dielectric encapsulation 63, the top electrode that is formed by the remaining portion of the recessed top surface of electrode material 120 over MTJ pillar 33, and the bottom electrode composed of electrode material 120 that is under MTJ pillar 33.

As depicted in FIG. 17, the portion of electrode material 120 under MTJ pillar 33 forming the bottom electrode of the MRAM device is thicker than the remaining portion of electrode material 120 over MTJ pillar 33 forming the top electrode. For example, when electrode material 120 over MTJ pillar 33 has a thickness of 10 nm, electrode material 120 under MTJ pillar 33 has a thickness greater than 10 nm (e.g., 20-30 nm) but the thicknesses for electrode material 120 over and under MTJ pillar 33 are not limited to these thicknesses.

Additionally, the top electrode and the bottom electrode of the MRAM device depicted in semiconductor structure 1700 are composed of the same electrode material that is conformally deposited in a single step or the same deposition process (e.g., as depicted in FIG. 12). In other words, electrode material 120 for the top and the bottom electrode is deposited in unison in a single deposition process. As depicted, in FIG. 17, electrode material 120 forming the bottom electrode under MTJ pillar 33 extends along the outside of dielectric encapsulant 63. The top surface of electrode material 120 which forms the bottom electrode and extends along a bottom portion of dielectric encapsulant 63 is level or even with the top surface of the top electrode formed by of the remaining portion of electrode material 120 that is over MTJ pillar 33 which forms the top electrode. In other words, the portion of electrode material 120 extending upward from and connecting to the bottom electrode and electrode material 120 forming the top electrode have top surfaces with the same height above metal cap 6.

Figure 18:
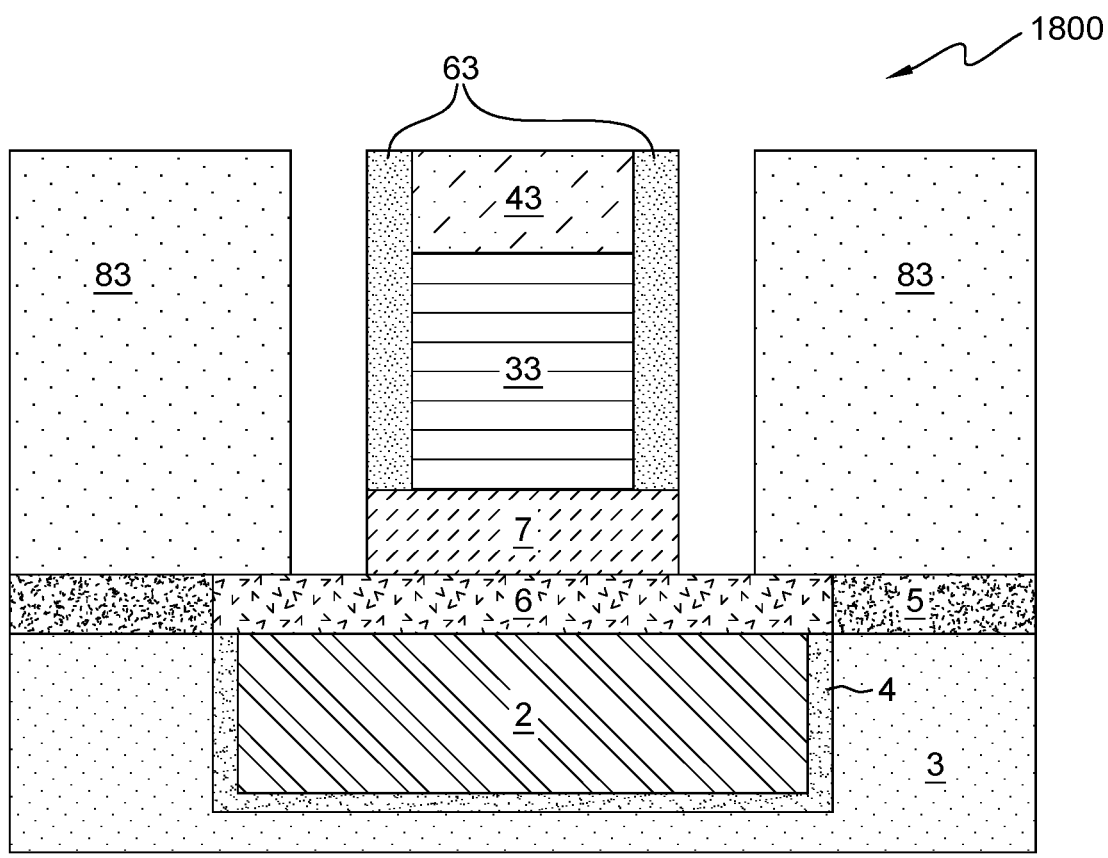
FIG. 18 depicts a cross-sectional view of the semiconductor structure after forming etching via holes adjacent to the MTJ pillar in accordance with a second embodiment of the present invention.

FIG. 18 depicts a cross-sectional view of semiconductor structure 1800 after etching via holes adjacent to MTJ pillar 33 in accordance with a second embodiment of the present invention. As depicted, FIG. 18 includes the elements of FIG. 9A as a step in a second embodiment of the present invention. FIG. 18 includes ILD 3, metal pad 2, metal cap 6, dielectric cap 5, bottom dielectric 7, MTJ pillar 33, dielectric encapsulation 63, ILD 83, and top dielectric 43. Semiconductor structure 1800 can be formed with the materials and processes as discussed with reference to FIGS. 1-9A. Using known dry or wet dielectric etching (e.g., RIE), two or more portions of ILD 83 are removed directly adjacent to dielectric encapsulation 63 and bottom dielectric 7. The removed portions may form a hole or a via hole adjacent to MTJ pillar 33 covered by dielectric encapsulant 63 and terminating above metal cap 6. Semiconductor structure 1800 after the via hole etching is essentially the same as semiconductor structure 900A.

Figure 19:
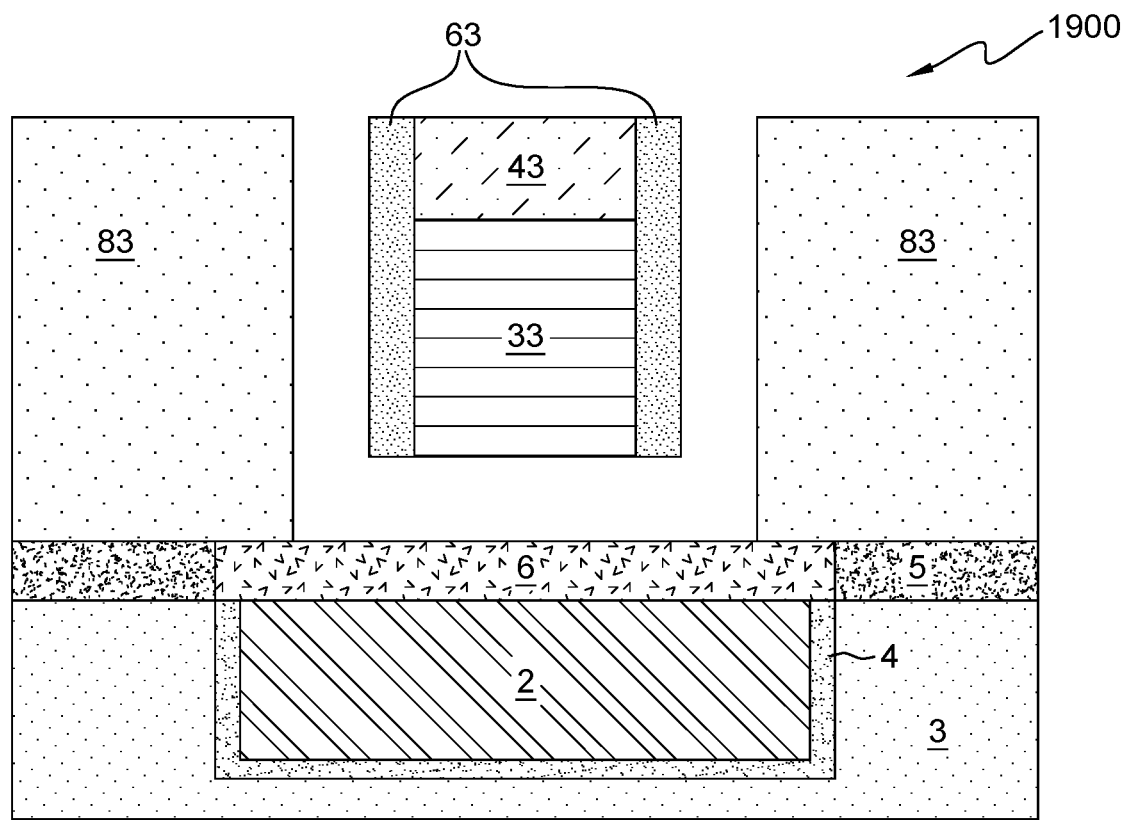
FIG. 19 depicts a cross-sectional view of the semiconductor structure after removing the remaining portion of the bottom dielectric layer in accordance with the second embodiment of the present invention.

FIG. 19 depicts a cross-sectional view of semiconductor structure 1900 after removing the remaining portion of bottom dielectric 7 in accordance with another embodiment of the present invention. As depicted, FIG. 19 includes the elements of FIG. 18 without bottom dielectric 7. For example, as previously discussed with respect to FIG. 10, using a wet etching process, the remaining portion of bottom dielectric 7 is removed under MTJ pillar 33 and dielectric encapsulation 63. After the dielectric etching process, a portion of the top surface of metal cap 6 is exposed.

Figure 20:
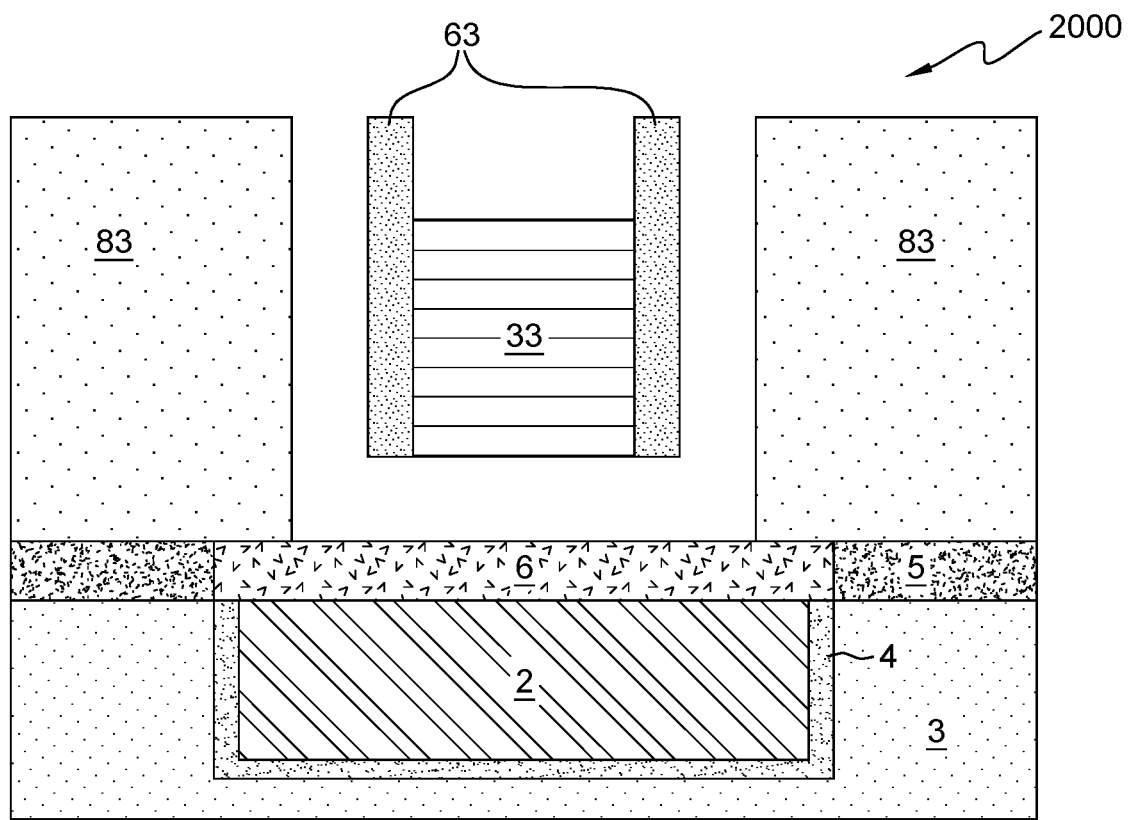
FIG. 20 depicts a cross-sectional view of the semiconductor structure after removing the portion of the bottom dielectric layer under the MTJ pillar in accordance with the second embodiment of the present invention.

FIG. 20 depicts a cross-sectional view of the semiconductor structure after removing top dielectric 43 in accordance with an embodiment of the present invention. As depicted, FIG. 20 includes the elements of FIG. 19 without top dielectric 43. Using one or more of the etching processes previously discussed with reference to FIG. 11, top dielectric 43 is removed to expose the top surface of MTJ pillar 33 and the portion of dielectric encapsulant 63 previously covered by top dielectric 43.

Figure 21:
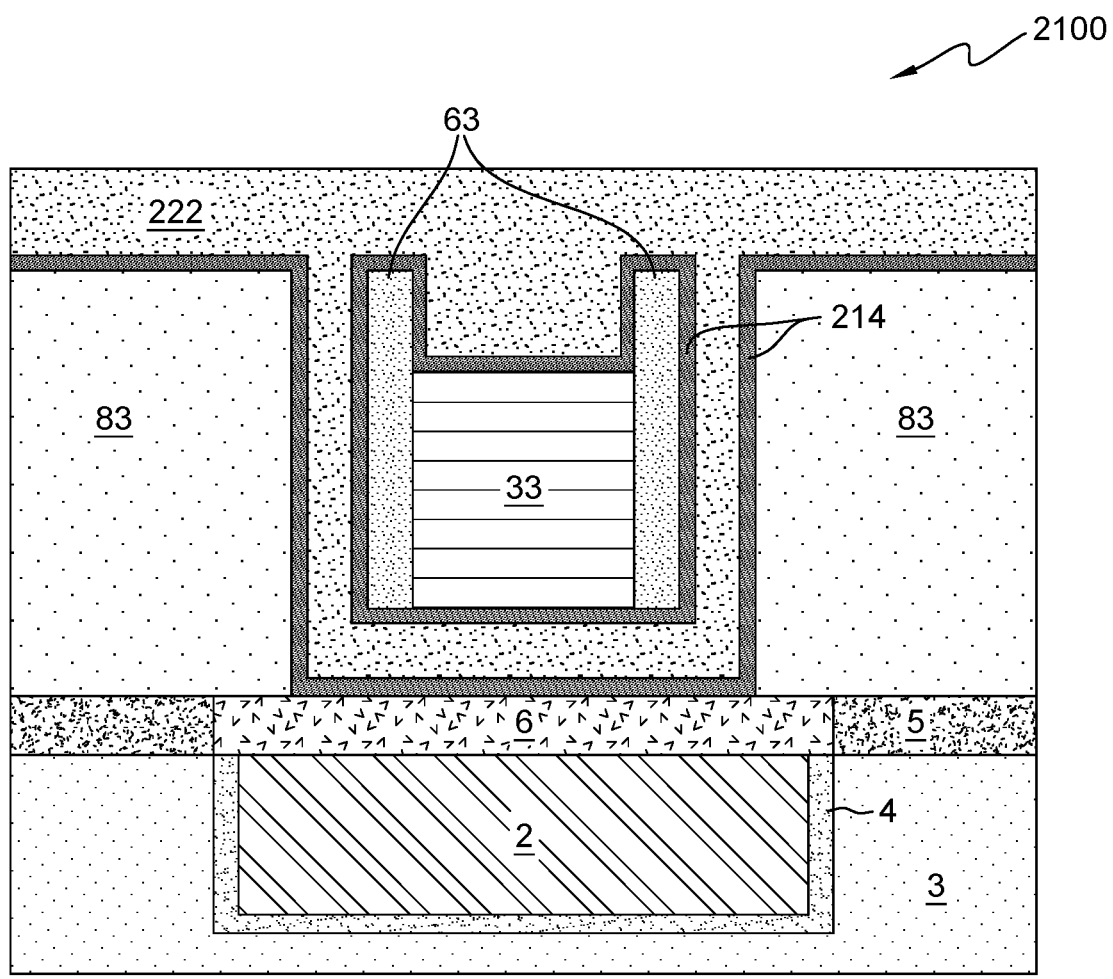
FIG. 21 depicts a cross-sectional view of the semiconductor structure after conformally depositing a metal nitride liner and an electrode metal in accordance with the second embodiment of the present invention.

FIG. 21 depicts a cross-sectional view of the semiconductor structure after conformally depositing electrode liner 214 and electrode metal 222 in accordance with an embodiment of the present invention. As depicted, FIG. 21 includes the elements of FIG. 20 and electrode metal 222 with electrode liner 214. Using one of the conformal deposition processes (e.g., ALD, PECVD, or CVD) previously discussed with respect to FIG. 12, a layer of a liner material for the electrode is deposited over the top surfaces of ILD 83, metal cap 6, dielectric encapsulation 63, metal cap 6, and around the exposed surfaces of MTJ pillar 33 and dielectric encapsulant 63 that forms a spacer around MTJ pillar 33. Electrode liner 214 can be conformally deposited. Electrode liner 214 can be composed of one or more of a metal nitride or a metal material including TiN, WN, HfN, TaN, Ta, or Ti but is not limited to these materials.

After depositing electrode liner 214, a layer of an electrode material for electrode metal 222 is deposited using known deposition processes such as PVD, CVD, or ALD, for example. Electrode metal 222 can be composed of any of the electrode materials previously discussed with respect to FIG. 12 for electrode material 120. For example, electrode metal 222 can be Ru, W, Pt, or another electrode material used in MRAM devices.

Figure 22:
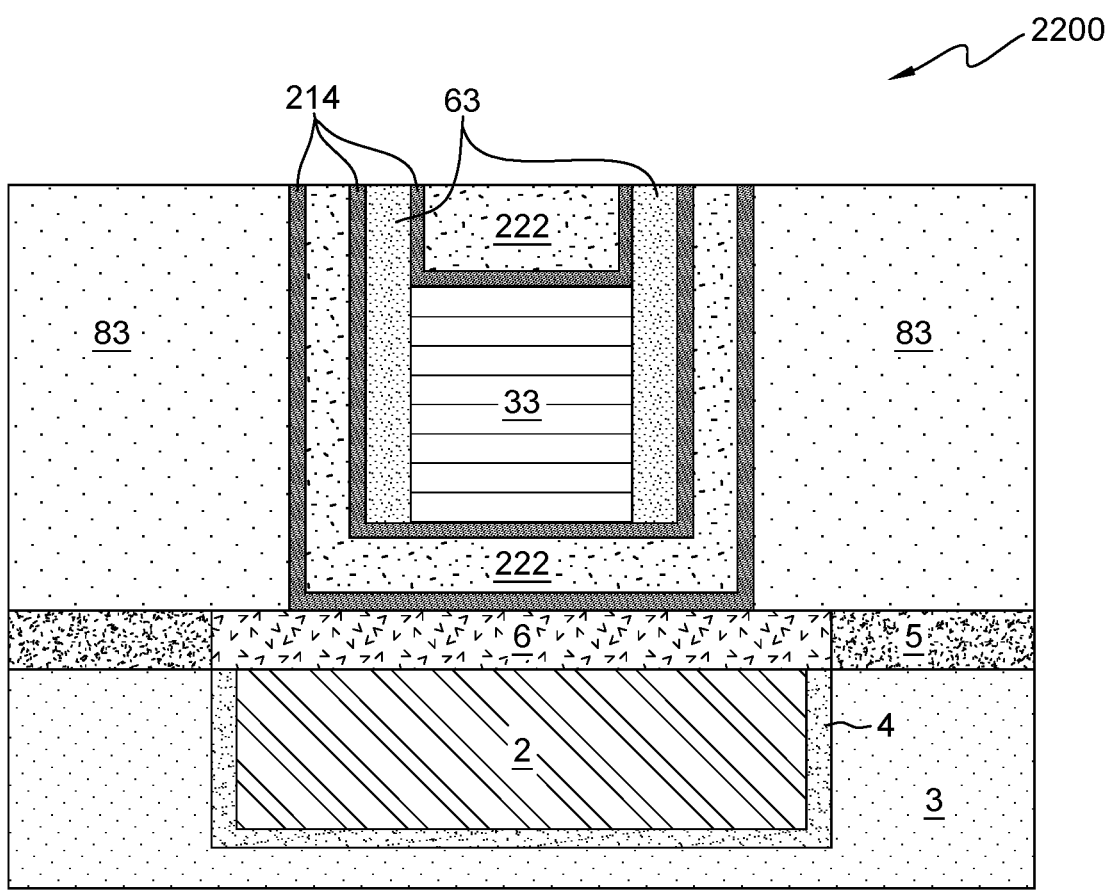
FIG. 22 depicts a cross-sectional view of the semiconductor structure after performing a chemical mechanical polish (CMP) in accordance with the second embodiment of the present invention.

FIG. 22 depicts a cross-sectional view of semiconductor structure 2200 after performing a CMP in accordance with an embodiment of the present invention. As depicted, FIG. 22 includes the elements of FIG. 21. After the CMP planarizes semiconductor structure 2200, the excess portions of electrode metal 222 and electrode liner 214 are removed exposing a top portion of ILD 83, dielectric encapsulant 63, and electrode metal 222.

Figure 23:
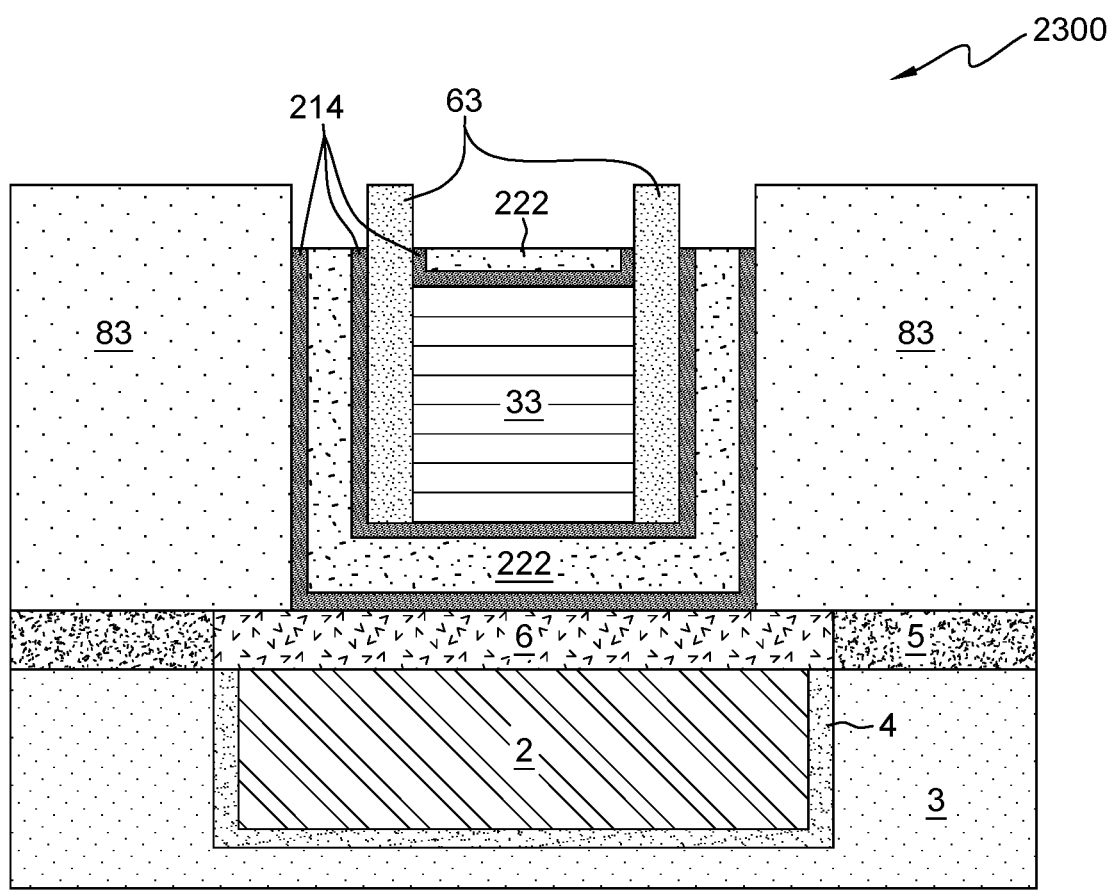
FIG. 23 depicts a cross-sectional view of the semiconductor structure after recessing the electrode metal over the MTJ pillar in accordance with the second embodiment of the present invention.

FIG. 23 depicts a cross-sectional view of semiconductor structure 2300 after recessing electrode metal 222 and electrode liner 214 over the MTJ pillar 33 and above a portion of metal cap 6 in accordance with an embodiment of the present invention. As depicted, FIG. 22 includes the elements of FIG. 21 without the top portion of electrode metal 222. Using one or more of the processes previously discussed with respect to FIG. 14, the top portion of electrode metal 222 and electrode liner 214 is removed. The thickness of the remaining portion of electrode metal 222 over MTJ pillar 33 typically ranges from 10 to 40 nm but is not limited to this range.

Figure 24:
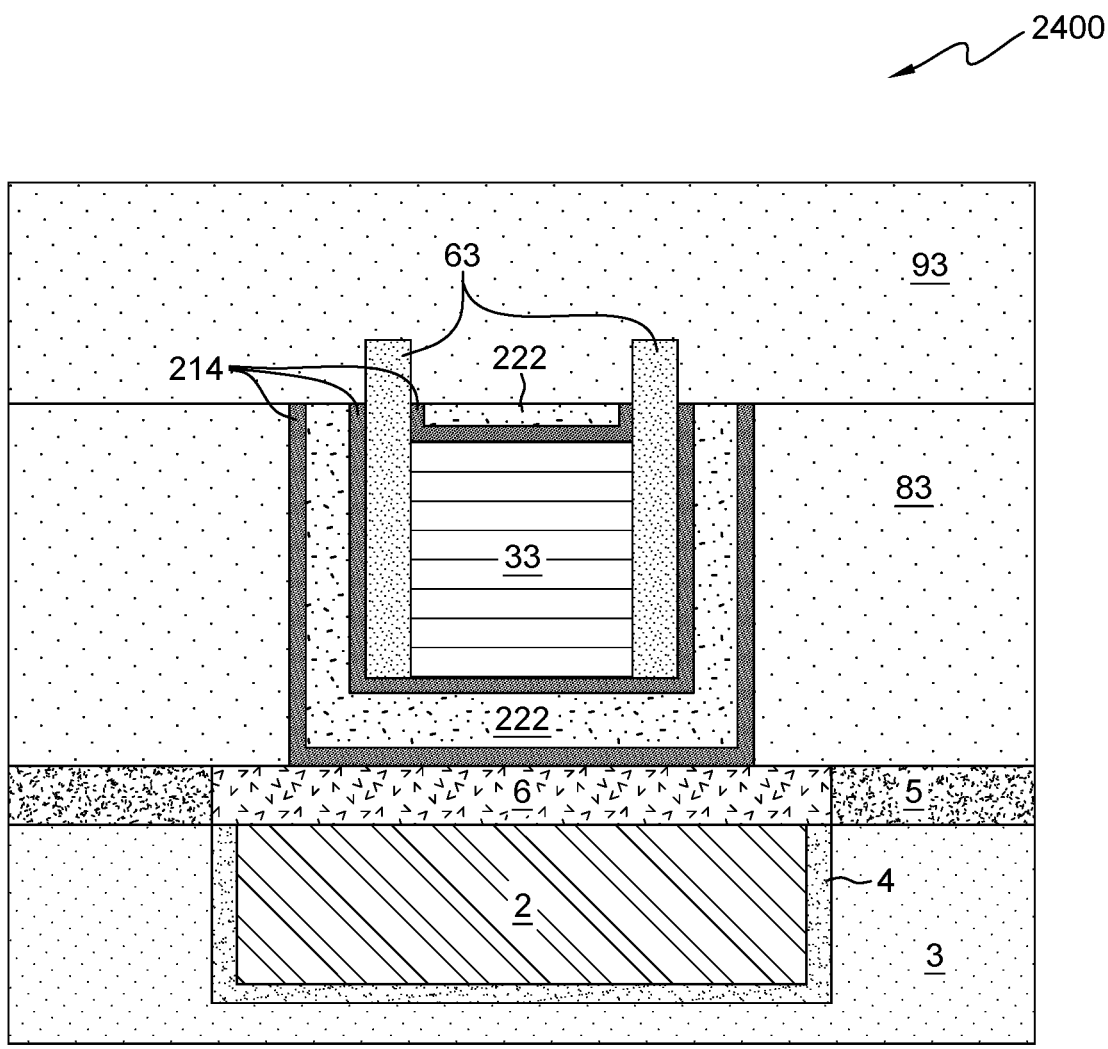
FIG. 24 depicts a cross-sectional view of the semiconductor structure after depositing another layer of ILD material in accordance with the second embodiment of the present invention.

FIG. 24 depicts a cross-sectional view of the semiconductor structure after depositing ILD 93 in accordance with an embodiment of the present invention. As depicted, FIG. 24 includes the elements of FIG. 23 and ILD 93. ILD 93 is deposited over semiconductor structure 2300. ILD 93 covers the top surface of ILD 83, electrode liner 214, electrode metal 222, and dielectric encapsulant 63.

Figure 25:
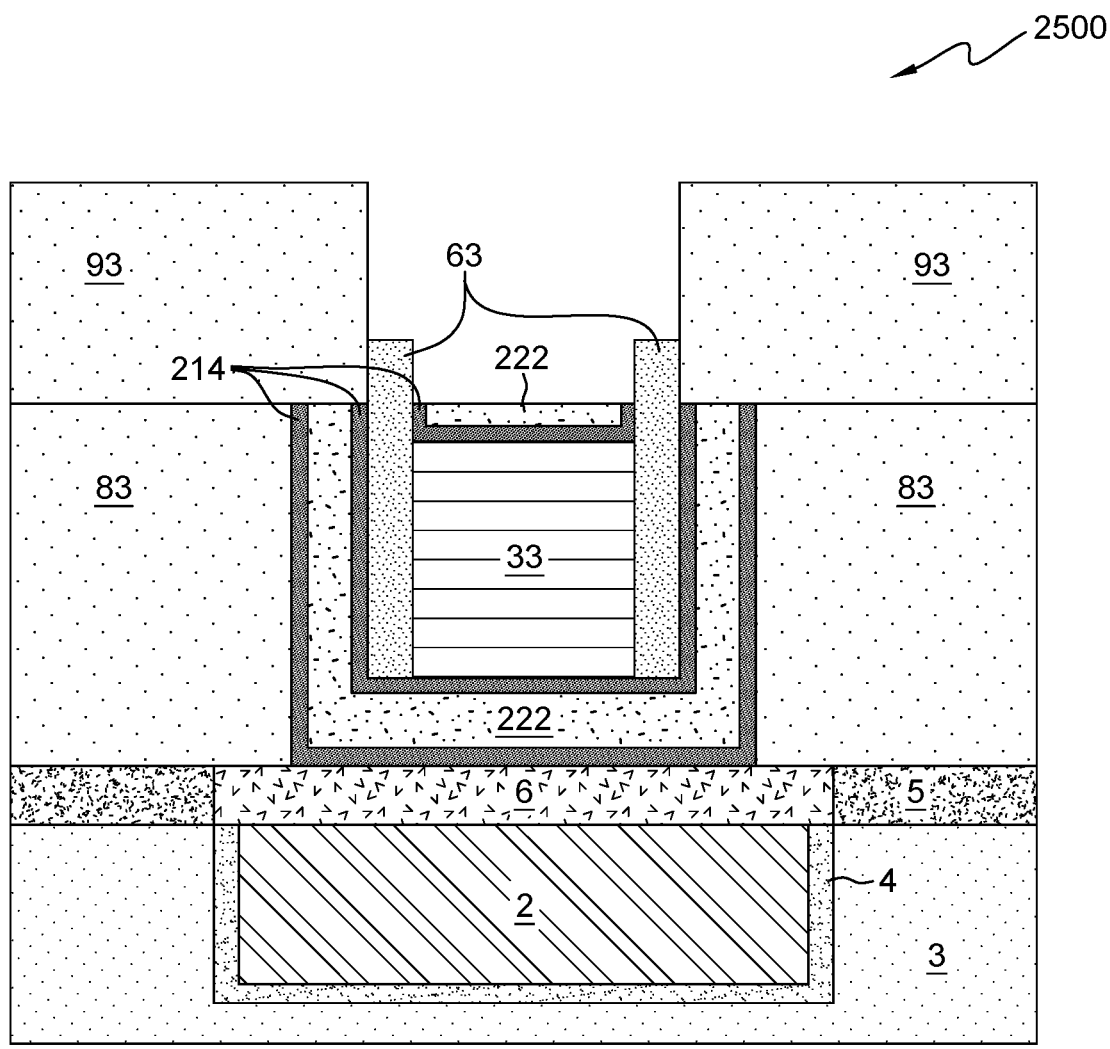
FIG. 25 depicts a cross-sectional view of the semiconductor structure after etching a contact via hole in accordance with the second embodiment of the present invention.

FIG. 25 depicts a cross-sectional view of semiconductor structure 2500 after etching a contact via hole in accordance with an embodiment of the present invention. As depicted, FIG. 25 includes the elements of FIG. 24 without portions of ILD 93 above dielectric encapsulant 63 and a portion of electrode metal 222 over MTJ pillar 33. Using a known etching process as previously discussed with respect for FIG. 16, a portion of ILD 93 is removed over MTJ pillar 33 and dielectric encapsulant 63.

Figure 26:
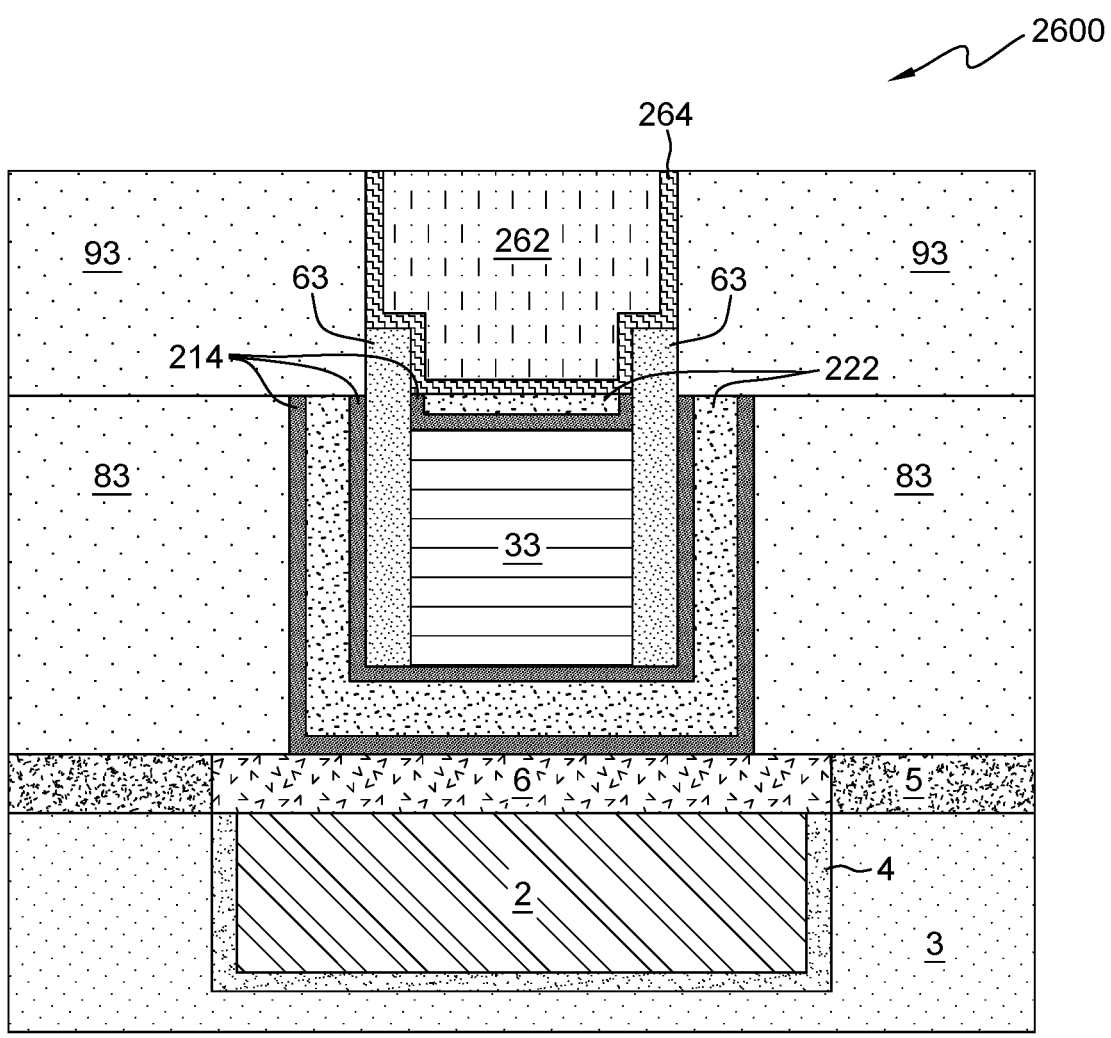
FIG. 26 depicts a cross-sectional view of the semiconductor structure after forming a contact to a top electrode over the MTJ pillar in accordance with the second embodiment of the present invention.

FIG. 26 depicts a cross-sectional view of semiconductor structure 2600 after forming contact 262 with contact liner 264 contacting a top electrode over MTJ pillar 33 in accordance with an embodiment of the present invention. As depicted, FIG. 26 includes the elements of FIG. 25 and contact 262 with contact liner 264. Using a process such as but not limited to ALD, PVD, and PECVD to deposit a layer of a liner material such as but not limited to one or more of metal nitride materials, such as titanium-nitrogen alloys, tantalum-nitrogen alloys, titanium-aluminum-nitrogen alloys, or tantalum-aluminum-nitrogen alloys or metal materials. Contact liner 264, as depicted, is deposited over electrode material 222, over and around dielectric encapsulant 63, and inside the recess in ILD 93. After depositing contact liner 264, contact 262, such as but not limited to copper (Cu), tantalum (Ta), titanium (Ti), W, or Ru is deposited over contact liner 264. A CMP planarizes contact 262 and removes the excess contact material and contact liner material from the top surface of ILD 93. After completing the CMP, contact 262 is complete over the MRAM device including a bottom electrode composed of electrode metal 222 surrounded by contact liners 214 around and under electrode metal 222, MTJ pillar 33 under a top electrode composed of electrode metal 222 surrounded by electrode liner 214 and the bottom portion of the MRAM device is surrounded by dielectric encapsulation 63. Similar to the MRAM device depicted in FIG. 17, the bottom electrode composed of electrode metal 222 is thicker than the top electrode over MTJ pillar 33 composed of electrode metal 222.

As depicted in FIG. 26, dielectric encapsulant 63 forms a spacer extending above the top surface of the top electrode formed by electrode metal 222 that is over MTJ pillar 33. The spacer composed of dielectric encapsulant 63 also extends above the top surface of the bottom electrode formed by electrode metal 222 outside of dielectric encapsulant 63 where the top surface of the bottom electrode directly contacts dielectric encapsulant 63 and is adjacent to the top surface of the top electrode over MTJ pillar 33.

While the invention has been shown and described with reference to certain exemplary embodiments thereof, it will be understood by those skilled in the art that various changes in form and details may be made therein without departing from the spirit and scope of the present invention as defined by the appended claims and their equivalents.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the one or more embodiments, the practical application or technical improvement over technologies found in the marketplace, or to enable others of ordinary skill in the art to understand the embodiments disclosed herein.

What is claimed is:

1. A semiconductor structure for a magnetoresistive random-access memory (MRAM) device, the semiconductor structure comprising:
   a bottom electrode under a magnetic tunnel junction (MTJ) pillar, wherein an electrode material of the bottom electrode extends vertically towards an interlayer dielectric layer and the electrode material surrounds a spacer, wherein the spacer encapsulates the MTJ pillar and wherein the bottom electrode have one of a round shape or an oval shape;
   a top electrode on the MTJ pillar, wherein the top electrode is thinner than the bottom electrode and wherein the top electrode have one of a round shape or an oval shape; and
   a metal contact with a liner is disposed over the top electrode on the MTJ pillar.

2. The semiconductor structure of claim 1, wherein the top electrode on the MTJ pillar is composed of a same material as the bottom electrode under the MTJ pillar.

3. The semiconductor structure of claim 1, wherein the bottom electrode and the top electrode are deposited in a single deposition.

4. The semiconductor structure of claim 1, wherein the MTJ pillar has a top surface with little edge roughness.

5. The semiconductor structure of claim 4, wherein the MTJ pillar has the top surface with little edge roughness has a smooth MTJ pillar sidewall.

6. The semiconductor structure of claim 5, wherein the MTJ pillar has the top surface with little edge roughness and the smooth MTJ pillar sidewall is formed using a dielectric material with one of a small grain size or no grain size as a hardmask.

7. The semiconductor structure of claim 1, wherein the MTJ pillar has sidewalls that are free of the electrode material of the bottom electrode.

8. The semiconductor structure of claim 7, wherein the MTJ pillar is formed before the electrode material of the bottom electrode is deposited.

9. The semiconductor structure of claim 1, further comprising:
   an electrode liner material surrounds the bottom electrode, bottom surfaces and a sidewall of the spacer encapsulating the bottom electrode, a top surface and a bottom surface of the MTJ pillar, and a sidewall of the top electrode; and
   a contact material above the MTJ pillar is inside the electrode liner material.

10. The semiconductor structure of claim 1, wherein the spacer encapsulating the MTJ pillar has a top surface that is above a top surface of the top electrode.

11. The semiconductor structure of claim 1, wherein the electrode material of the bottom electrode extends up the spacer encapsulating the MTJ pillar is on at least two opposite sides of the spacer encapsulating the MTJ pillar, and wherein the electrode material of the bottom electrode has a top surface that is level with a top surface of the top electrode.

12. The semiconductor structure of claim 6, wherein the dielectric material with no grain size as the hardmask for forming the MTJ pillar is an amorphous material.

* * * * *